(12) United States Patent  
Kozina et al.

(10) Patent No.: US 9,075,860 B2
(45) Date of Patent: Jul. 7, 2015

(54) DATA LINEAGE SYSTEM

(71) Applicant: Oracle International Corporation, Redwood Shores, CA (US)

(72) Inventors: Ludmila Kozina, Cambridge, MA (US); John K. Rees, Brookline, MA (US); Abhishek Narayan, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 13/803,883

(22) Filed: Mar. 14, 2013

(65) Prior Publication Data

US 2014/0114907 A1    Apr. 24, 2014

Related U.S. Application Data

(60) Provisional application No. 61/715,428, filed on Oct. 18, 2012.

(51) Int. Cl.
  *G06F 7/00* (2006.01)
  *G06F 17/00* (2006.01)
  *G06F 17/30* (2006.01)

(52) U.S. Cl.
  CPC .... *G06F 17/30592* (2013.01); *G06F 17/30563* (2013.01); *G06F 17/30309* (2013.01)

(58) Field of Classification Search
  CPC ................... G06F 17/30309; G06F 17/30312; G06F 17/30572
  USPC ........................... 707/600, 602, 603, 609, 803
  See application file for complete search history.

(56) References Cited

U.S. PATENT DOCUMENTS 5,889,674 A * 3/1999 Burdick et al. ................ 700/121
6,343,295 B1 * 1/2002 MacLeod et al. ............. 707/103
6,389,429 B1 * 5/2002 Kane et al. .................... 707/609

(Continued)

FOREIGN PATENT DOCUMENTS

EP      2015199 A1    1/2009

OTHER PUBLICATIONS

Jing Zhang et al., "Provenance in Dynamic Data Systems", TaPP '11 3rd USENIX Workshop on the Theory and Practice of Provenance, Jun. 20, 2011, pp. 1-5, XP055090871, www.usenix.org/event/tapp11/tech/final_files/ Zhang.pdf.

(Continued)

*Primary Examiner* — Marc Somers
(74) *Attorney, Agent, or Firm* — Miles & Stockbridge P.C.

(57) ABSTRACT

A data lineage system is provided that traces a data lineage of a data warehouse. The data lineage system maps a target data element to one or more source data elements. The data lineage system further stores one or more source surrogate keys within one or more auxiliary columns of a target data record. The data lineage system further stores, for each source data element, a data lineage mapping system record within a data lineage mapping system table that represents the mapping of the target data element and the corresponding source data element. The data lineage system further maps a source data element to one or more target data elements. The system further stores, for each target data element, a shadow system record within a shadow system table that represents the mapping of the source data element and the corresponding target data element.

26 Claims, 19 Drawing Sheets

(56) References Cited

U.S. PATENT DOCUMENTS

| | | |
|---|---|---|
| 6,434,558 B1 | 8/2002 | MacLeod et al. |
| 7,117,219 B1 | 10/2006 | Powers et al. |
| 7,493,570 B2 * | 2/2009 | Bobbin et al. ............... 715/800 |
| 8,078,579 B2 | 12/2011 | Grossman et al. |
| 8,205,189 B2 | 6/2012 | Grossman et al. |
| 8,688,625 B1 | 4/2014 | Clark et al. |
| 2004/0199836 A1 | 10/2004 | Ghosh et al. |
| 2007/0061353 A1 | 3/2007 | Bobbin et al. |
| 2007/0130181 A1 | 6/2007 | Allen et al. |
| 2007/0255741 A1 | 11/2007 | Geiger et al. |
| 2008/0016110 A1 | 1/2008 | Grossman et al. |
| 2008/0037854 A1 | 2/2008 | Grossman et al. |
| 2010/0318494 A1 | 12/2010 | Val et al. |
| 2011/0196861 A1 | 8/2011 | Egnor et al. |
| 2011/0295791 A1 | 12/2011 | Venkatasubramanian et al. |
| 2011/0313969 A1 | 12/2011 | Ramu |
| 2011/0320460 A1 | 12/2011 | Fankhauser et al. |
| 2012/0084074 A1 | 4/2012 | Chronister et al. |
| 2012/0310875 A1 | 12/2012 | Prahlad et al. |
| 2013/0054605 A1 | 2/2013 | Yeh et al. |
| 2013/0262525 A1 * | 10/2013 | Burda et al. ................... 707/803 |
| 2013/0332423 A1 | 12/2013 | Puri et al. |

OTHER PUBLICATIONS

Ludmila Kozina et al., U.S. Appl. No. 13/804,049, filed Mar. 14, 2013.

Poolet, "Surrogate Key vs. Natural Key", Business Intelligence content from SQL Server Pro, Jan. 23, 2002, last downloaded Jan. 17, 2015.

* cited by examiner

| Data Model.Table.Column | Value | Datatype | Preferred Path | Primary Key |
|---|---|---|---|---|
| ◆ Analysis.BMI.BMI | 23.3 | NUMBER(4,1) | | Subject 1007, Visit 4, Site McLean |
| ▦ Source.DEMOGRAPHY.HEIGHT | 62.0 | NUMBER | NO | Subject 1007 |
| ▦ Source.DEMOGRAPHY.HEIGHTU | IN | VARCHAR2(20) | NO | Subject 1007 |
| ▽ Review.MILESTONE_VISITS.WEIGHT | 82.1 | NUMBER | YES | Subject 1007, Visit 4, Site McLean |
| ▽ All_Sites.VISITS.WT | 181.0 | NUMBER | YES | Subject 1007, Visit 4, Site McLean |
| ▦ Source.SITE_B_VISITS.WT | 181.0 | NUMBER | YES | Subject 1007, Visit 4, Site McLean |
| ▽ Review.MILESTONE_VISITS.WEIGHTU | KG | VARCHAR2(20) | NO | Subject 1007, Visit 4, Site McLean |
| ▽ All_Sites.VISITS.WTU | LBS | VARCHAR2(20) | NO | Subject 1007, Visit 4, Site McLean |
| ▦ Source.SITE_B_VISITS.WTU | LBS | VARCHAR2(20) | NO | Subject 1007, Visit 4, Site McLean |

Fig. 4

| DME_CONTEXT_MAP | |
|---|---|
| COMPANY_ID | NUMBER(6) |
| STUDY_ID | NUMBER |
| LIFECYCLE_RC | VARCHAR2(30) |
| TMAP_ID | NUMBER |
| TMAP_TYPE_RC | VARCHAR2(50) |
| TALL_SKINNY_RC | VARCHAR2(30) |
| SRC_DM_OBJ_ID | NUMBER |
| SRC_TAB_OBJ_ID | NUMBER |
| SRC_COL_OBJ_ID | NUMBER |
| TRG_DM_OBJ_ID | NUMBER |
| TRG_TAB_OBJ_ID | NUMBER |
| TRG_COL_OBJ_ID | NUMBER |
| TRG_PERSISTENT_RC | VARCHAR2(30) |
| SRC_SKEY_COL_OBJ_ID | NUMBER |
| PREFERRED_ROUTE_RC | VARCHAR2(30) |
| FILTER_COL_OBJ_ID | NUMBER |
| FILTER_VALUE | VARCHAR2(255) |
| CREATED_BY | NUMBER(15) |
| CREATION_DATE | DATE |
| LAST_UPDATED_BY | NUMBER(15) |
| LAST_UPDATE_DATE | DATE |
| LAST_UPDATE_LOGIN | NUMBER(15) |

Fig. 6

| DME_CTXT_SKEYS_MAP | |
|---|---|
| COMPANY_ID | NUMBER(6) |
| STUDY_ID | NUMBER |
| LIFECYCLE_RC | VARCHAR2(30) |
| TRG_TAB_OBJ_ID | NUMBER |
| SRC_TAB_OBJ_ID | NUMBER |
| FILTER_VALUE | VARCHAR2(255) |
| SRC_SKEY_COL_OBJ_ID | NUMBER |
| TRG_SKEY_VALUE | VARCHAR2(4000) |
| SRC_SKEY_VALUE | VARCHAR2(4000) |

Fig. 7

| DME_OPOBJ_CONTEXT_MAP | |
|---|---|
| COMPANY_ID | NUMBER(6) |
| STUDY_ID | NUMBER |
| LIFECYCLE_RC | VARCHAR2(30) |
| OPOBJ_ID | NUMBER |
| OPOBJ_TYPE_ID | NUMBER |
| IS_PRIMARY_RC | VARCHAR2(30) |
| IS_RECORD_LEVEL_RC | VARCHAR2(30) |
| PREFERRED_ROUTE_RC | VARCHAR2(30) |
| DM_OBJ_ID | NUMBER |
| TAB_OBJ_ID | NUMBER |
| COL_OBJ_ID | NUMBER |
| SKEY_VALUE | VARCHAR2(4000) |
| CREATED_BY | NUMBER(15) |
| CREATION_DATE | DATE |
| LAST_UPDATED_BY | NUMBER(15) |
| LAST_UPDATE_DATE | DATE |
| LAST_UPDATE_LOGIN | NUMBER(15) |

DATA LINEAGE SYSTEM

CROSS-REFERENCE TO RELATED APPLICATIONS

This application claims priority of U.S. Provisional Patent Application Ser. No. 61/715,428, filed on Oct. 18, 2012, the subject matter of which is hereby incorporated by reference.

FIELD

One embodiment is directed to a computer system, and more particularly, to a computer system that manages data.

BACKGROUND

A data warehouse can be used to store data used for reporting and analysis. A computer system can collect data from multiple distributed sources and store the integrated data in data models within the data warehouse. Users can apply transformations to the data in preparation for data review, data analysis, and data mining based on the stored data. Further, the data can often be associated with associated information, such as comments, error reports, tags, and flags/state information.

SUMMARY

One embodiment is a system that traces a data lineage of a data warehouse including one or more data tables, where each data table includes one or more data records. The system maps a target data element to one or more source data elements, where the target data element includes a column of a target data table definition, and where each source data element includes a column of a source table definition. The system further extends the target table definition to include one or more auxiliary columns to store one or more source surrogate keys. The system further stores, for each source data element, a data lineage mapping system record within a data lineage mapping system table that represents the mapping of the target data element and a corresponding source data element together with an column identity of an auxiliary column in the target table that stores a source surrogate key. The system further stores one or more source surrogate key values within the one or more auxiliary columns of the target data record at the time the target data record is created or modified. The system further stores, for each target data record, one or more shadow system records within a shadow system table that represents a mapping of the source data record and a corresponding target data record source surrogate key value. The data lineage includes the one or more data lineage mapping system records, the one or more shadow system records, and the one or more source surrogate keys.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4 illustrates an example user interface that displays a data lineage, according to an embodiment of the invention.

FIG. 6 illustrates a block diagram of a data lineage mapping table, according to an embodiment of the invention.

FIG. 7 illustrates a block diagram of a shadow table, according to an embodiment of the invention.

FIG. 9 illustrates a block diagram of an associated object mapping table, according to an embodiment of the invention.

FIG. 11 illustrates an example data lineage trace of a union transformation, according to an embodiment of the invention.

FIG. 12 illustrates an example source data lineage trace of a pivot transformation, according to an embodiment of the invention.

FIG. 13 illustrates an example target data lineage trace of a pivot transformation, according to an embodiment of the invention.

FIG. 14 illustrates an example source data lineage trace of an unpivot transformation, according to an embodiment of the invention.

FIG. 15 illustrates an example target data lineage trace of an unpivot transformation, according to an embodiment of the invention.

FIG. 16 illustrates an example data lineage trace of a join transformation, according to an embodiment of the invention.

DETAILED DESCRIPTION

Figure 1:
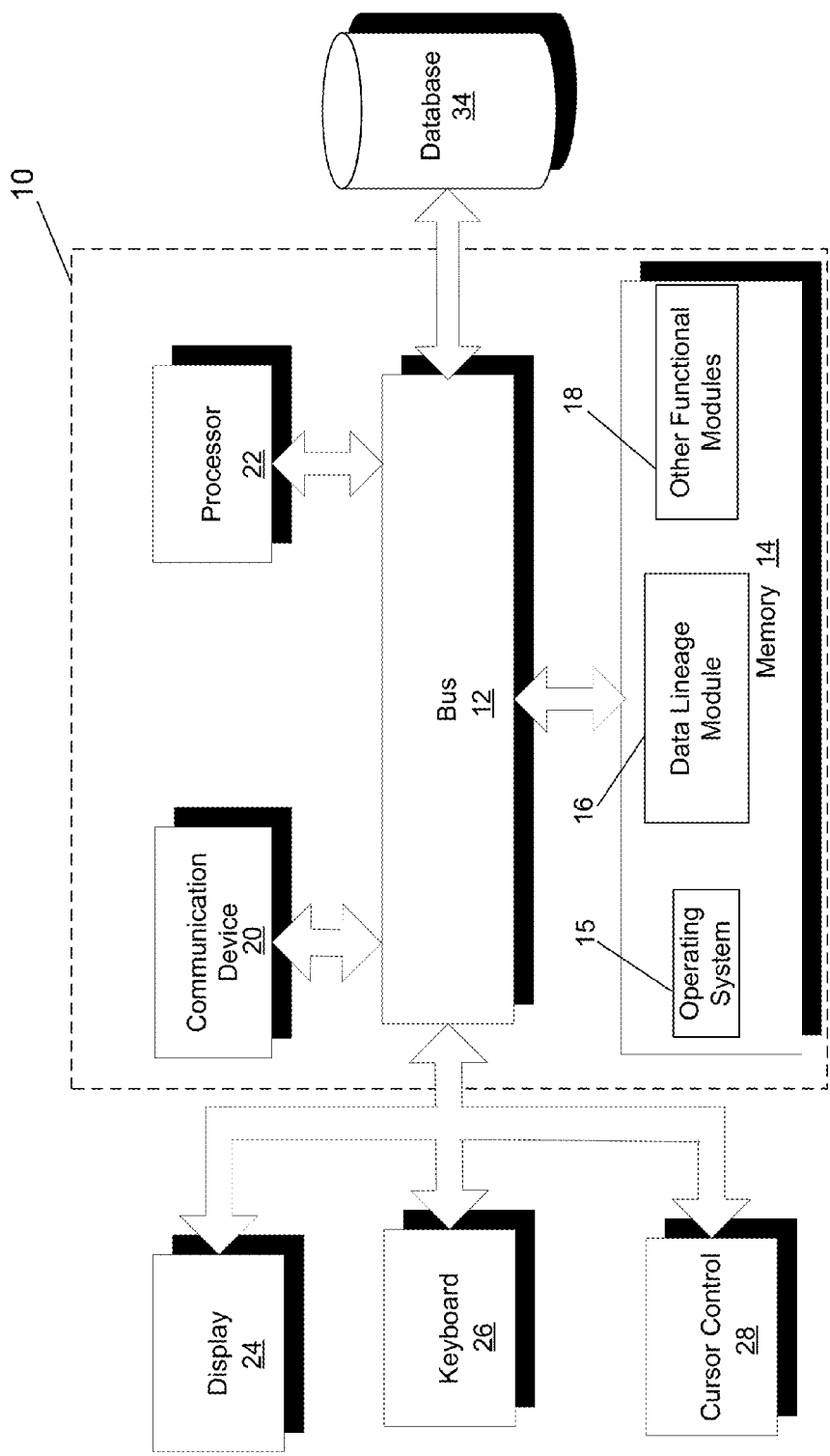
FIG. 1 illustrates a block diagram of a system that can implement an embodiment of the invention.

In one embodiment, a system is provided that can provide a data lineage tracing through a pathway of one or more transformations performed on a set of data that can be stored within a data warehouse, where the set of data is stored within one or more tables, where each table includes one or more data records. A "transformation" or "data transformation" is a conversion of one or more data records of a first format into one or more data records of a second format, where a data record can include one or more data values. For a given target data element, the system can identify a set of source data elements that produced the target data element as well as a path from the set of source data elements to the target data element, where a "data element" includes a data value stored in a column of a data record. Similarly, for a given source data element, the system can identify an exact set of target data elements that are derived from the source data element as well as a path from the source data element to each of the target data elements. Thus, the system can provide data lineage tracing information, in addition to the stored data within the data warehouse, to further facilitate an in-depth analysis of the stored data. In certain embodiments, the stored data within the data warehouse can be stored within one or more "data records," and the data lineage tracing information can be stored within one or more "system records." As defined here, a "data record" can be any type of record that stores data of the data warehouse, and a "system record" can be any type of record that stores data lineage tracing information.

According to the embodiment, in order to trace data lineage from a source data element to a target data element, and vice-versa, the system can store the following data lineage tracing information for each transformation: (a) one or more metadata mappings from one or more columns in one or more source table definitions to each column in a target table of a transformation, identified as "column mapping data," which is metadata information regarding the data reorganization carried out by the transformation; (b) one or more mappings from one or more actual data records in one or more source tables to each actual data record in a target table populated by the execution of a transformation, identified as "record mapping data;" and (c) additional data lineage tracing information specific to the transformation, such as the type of the transformation. The column mapping data can be stored when a transformation is defined or it can be stored to describe the behavior of an existing transformation program. Such transformation column mapping data can include: (a) a source table and source column; (b) a target table and target column; (c) a transformation type; and (d) additional information required for the specific transformation. Record mapping data associated with data records processed by a transformation can be stored when a transformation is executed. The record mapping data can include: a) the identity of a source data record; b) the identity of the target data record; and c) additional information for the specific transformation. The identity of a data record can be a single column, or can include multiple columns, whose value(s) uniquely identify the data record within the data table, also known as a primary or unique key. According to the embodiment, each data record in a target table of a transformation can store an identity for a source data record that provided the data for one or more columns in the transformation for that target data record, where this identity is identified as a "source key." In certain embodiments these identifying values can be combined into a single value or "surrogate source key" that can be used to identify the data record. In certain embodiments, the surrogate key can include additional information regarding the transformation used to transform the source data record into the target data record. In situations where a target data record contains data from multiple source data records, the target table can be extended with an appropriate number of columns, so that the target data record can store an appropriate number of source surrogate keys. The system can then store the relationships between the one or more source surrogate key columns in the target table that hold the record mapping data and the target columns associated with the corresponding source tables stored as the column mapping data. This combined data can be used by the system to provide a source or target data lineage trace for a data element.

In another embodiment, a system is provided that can leverage data lineage tracing information to support the visibility of "associated information" or "associated objects" that are linked to data elements, and to propagate the associated information (i.e., associated objects) to related source data elements and target data elements for display and access. The system can also support the export of associated information (i.e., associated objects) to an external system through a path of transformations within the data lineage to an external source for the data.

According to the embodiment, an "associated object" can be any associated information (i.e., any information other than the data element that the associated object is associated with, or any other data element in the data warehouse that is already associated by data lineage) that is associated with a data element stored within the data warehouse. One type of an associated object is an operational object. One or more associated objects can also be identified as "associated information." An example of an associated object is a "discrepancy." A "discrepancy" is an indication that one or more characteristics of the data element deviate from an expected characteristic. Such a deviation can be human-detected or machine-detected based on one or more data-driven rules. Further, a discrepancy can be created manually by a user of a system, or can be created automatically by the system, for example, as a result of a validation of the data. An example of a discrepancy is an error report. Other examples of associated objects can include, but are not limited to, a "comment," a "status flag," a "state indicator," a "tag," an "image," a "recording," a "file," a "link," and a "document." A "comment" is a collection of text entered by a user that pertains to the data element. A "status flag" is an indication of a status of the data element. A "state indicator" is an indication of a state of the data element. A "tag" is a word or phrase that pertains to the data element. An "image" is an image that pertains to the data element. A "recording" is a recording of any audio or video that pertains to the data element. A "file" is a computer file that pertains to the data element. A "link" is a Hypertext Markup Language ("HTML") link that pertains to the data element. A "document" is an external document that pertains to the data element. An associated object may be linked to either a data element or to an entire data record.

According to the embodiment, the system can store links between associated objects and the data elements or data records associated with the associated object. The data element or data record, where the associated object was initially created, or originally associated (as the associated object can be a pre-existing associated object), can be marked as a primary link. The links generated by the system to provide visibility of the associated object within the data lineage, including both upstream of the data element or data record and downstream of the data element or data record, can be marked as secondary links. Thus, according to the embodiment, an associated object, such as a discrepancy, can be visible both upstream of the data element or data record and downstream of the data element or data record within the data lineage. To provide this visibility, the system can: (a) store a primary link between the associated object and the data element (or data record); (b) trace source and target lineage of the data element (or data record); (c) store one or more secondary links between the associated object and each data element in the source and target trace from the primary data element; and (d) provide both primary and secondary link information to a user interface for display of associated object visibility. Further, the links generated by the system can be used to obtain direct access to an associated object from an upstream or downstream data element, as opposed to traversing a data lineage to detect the existence of the associated object.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disc read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a data lineage module 16, as well as other functional modules 18. Operating system 15 can provide an operating system functionality for system 10. Data lineage module 16 can provide functionality for tracing a data lineage, as will be described in more detail below. In certain embodiments, data lineage module 16 can comprise a plurality of modules, where each module provides specific individual functionality for tracing a data lineage. System 10 can also be part of a larger system. Thus, system 10 can include one or more additional functional modules 18 to include the additional functionality. For example, functional modules 18 may include modules that provide additional functionality, such as a module of the "Oracle Life Sciences Data Hub" product from Oracle Corporation. In one embodiment, functional modules 18 may include an associated information propagation module that can provide functionality for propagating visibility of associated information, as will be described in more detail below.

Processor 22 can also be operatively coupled via bus 12 to a database 34. Database 34 can store data in an integrated collection of logically-related data records, system records, or data files. Database 34 can be an operational database, an analytical database, a data warehouse, a distributed database, an end-user database, an external database, a navigational database, an in-memory database, a document-oriented database, a real-time database, a relational database, an object-oriented database, a data management workbench, or any other database known in the art.

Figure 2:
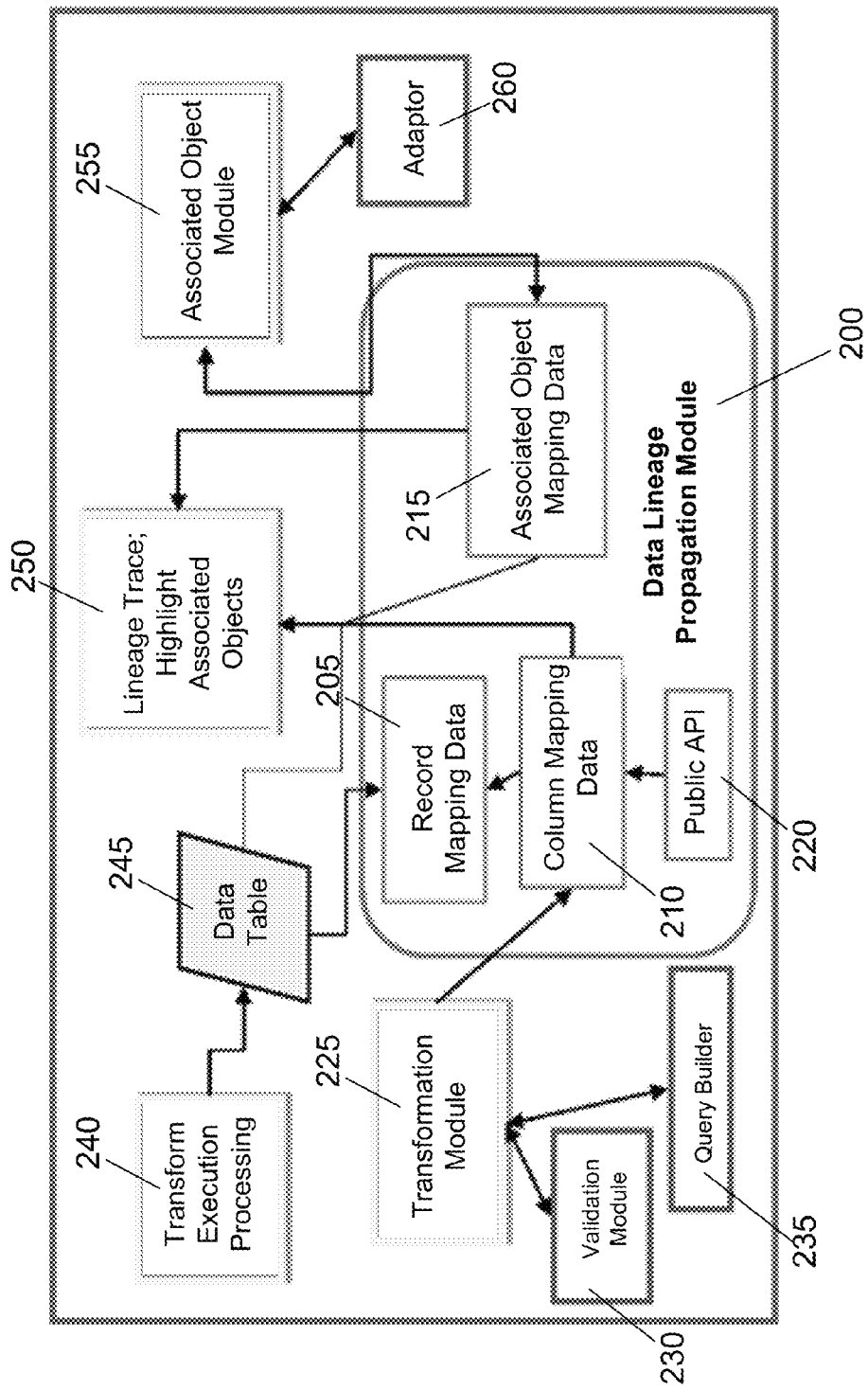
FIG. 2 illustrates a block diagram of a logical data model for a system, according to an embodiment of the invention.

FIG. 2 illustrates a block diagram of a logical data model for a system, according to an embodiment of the invention. The logical data model can include data lineage propagation module 200. Data lineage propagation module 200 is a module that can provide functionality for tracing a data lineage, as well as functionality for propagating visibility of associated information, as will be described below in greater detail. In certain embodiments, data lineage propagation module 200 can include a separate data lineage module that provides the functionality for tracing a data lineage, and a separate associated information propagation module that provides the functionality for propagating visibility of associated information.

According to the embodiment, data lineage propagation module 200 can produce record mapping data 205, column mapping data 210, and associated object mapping data 215. As previously described, record mapping data 205 includes a source surrogate key (i.e., an identity of a source data record) that is stored in a data record in a target table of a transformation. As also previously described, column mapping data 210 includes a source table and column of a transformation, a target table and column of the transformation, a transformation type, and any additional information required for the transformation. Further, column mapping data 210 can be derived from a transformation definition. Finally, as also previously described, associated object mapping data 215 includes links between associated objects and the data elements or data records associated with the associated object (identified as primary links). Associated object mapping data 215 also includes links generated by data lineage propagation module 200 to provide visibility of the associated object in upstream and downstream data models (identified as secondary links). Such visibility can include efficient access of the associated object, especially for visually identifying data elements or data records that are associated with the associated object in data displays. Data lineage propagation module 200 can further include public application programming interface ("API") 220. Public API 220 is an API that can be provided so that a user of the system can enter column mapping data into data lineage propagation module 200. This can allow a user to store mappings for the data using a custom computer program, such as a custom procedural language/structured query language ("PL/SQL") program or a custom statistical analysis system ("SAS") program.

According to the embodiment, the logical data model can further include transformation module 225, validation module 230, and query builder 235. Transformation module 225 can identify unique sources of mapped data and add source surrogate keys to a definition of one or more target data tables. Further, based on one or more transformation definitions, transformation module 225 can store column mapping data 210 for one or more transformations. Transformation module 225 can further allow a user to provide custom column mapping data for a custom transformation that is identified to transformation module 225. Transformation module 225 can implement validation module 230 and query builder 235, where validation module 230 can read one or more data records, test the data values of one or more data records, and create one or more discrepancies for the data values, and where query builder 235 can build a query or database view of data coming from one or more data tables while maintaining the same metadata source column to target column mapping as a transformation. In certain embodiments, transformation mapping data can also include a "preferred source path." When a target column of a transformation has multiple immediate source columns, one column can be identified as a preferred source column. This information can be tracked as part of column mapping data 210. Thus, a "preferred source path" is a path through transformations of preferred source columns. In other words, a preferred source path is a single source path that is identified from multiple possible source paths as being preferred over the other possible source paths. This can be done to provide a unique path to a single source data element for attaching queries or other associated objects that may be sent to a source system that provided the source data.

During execution of a transformation (illustrated in FIG. 2 as transformation execution processing 240), record mapping data 205 can be stored in one or more source surrogate keys, where the one or more surrogate keys can be stored in one or more auxiliary columns of one or more target tables of the transformation (illustrated in FIG. 2 as data table 245). According to the embodiment, a combination of record mapping data 205 and column mapping data 215, as well as other data lineage tracing information, can be used to display a trace of a data lineage of source or target data elements (illustrated in FIG. 2 as lineage trace 250), as is described below in greater detail.

According to the embodiment, the logical data model can further include associated object module 255 and adaptor 260. Associated object module 255 can enter data within associated object mapping data 215 for each associated object. Data from associated object mapping data 215 can be used to visually highlight a display of one or more data elements that have associated objects associated with them (illustrated in FIG. 2 as highlight associated objects 250). According to certain embodiments, associated object module 255 can request a preferred source path for each data element associated with an associated object. Further, one or more associated objects can be created within the system using adaptor 260. Adaptor 260 can use associated object module 255 to create the one or more associated objects within the system, and then associated object module 255 can use data lineage propagation module 200 to propagate the visibility of the associated objects within the trace of the data lineage of the source or target data elements. In certain embodiments, the logical data module can further include an additional module (not illustrated in FIG. 2) that displays one or more data elements from one or more data tables, and that highlights the existence of one or more associated objects that are associated with the one or more data elements.

Figure 3:
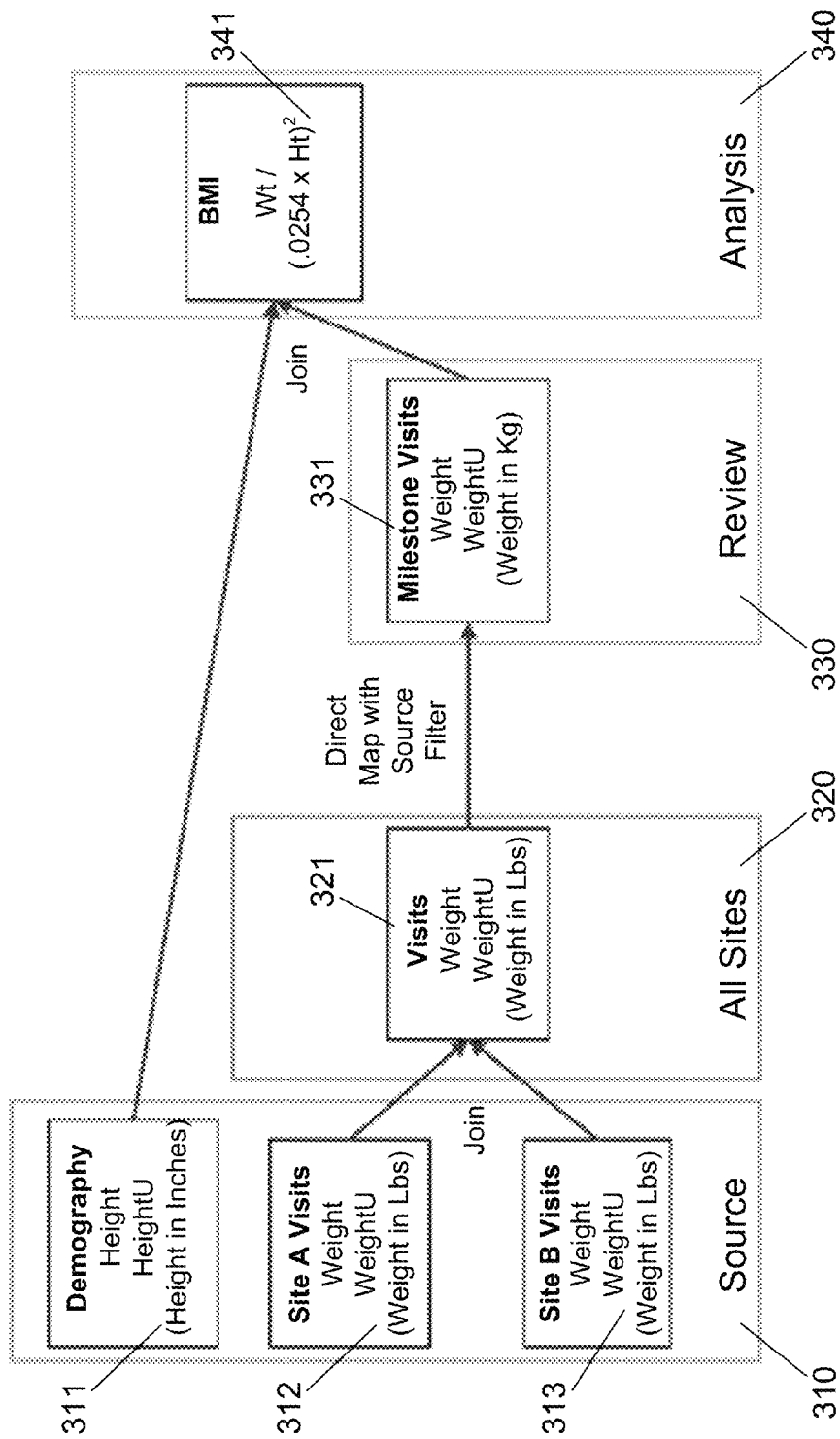
FIG. 3 illustrates a block diagram of an example data lineage, according to an embodiment of the invention.

FIG. 3 illustrates a block diagram of an example data lineage, according to an embodiment of the invention. According to an embodiment, a system can generate a trace of a data lineage of data stored within a data warehouse. Within this data lineage trace, a user of the system can select a data element in a target table and request a trace upstream through one or more transformation steps to one or more source data elements that the selected data element is derived from. Further, the user can select a data element in source table and request a trace downstream through one or more transformation steps to one or more target data elements that are derived from the selected data element. With respect to the transformation, according to the embodiment, there can be different types of transformations. Such transformation types can include: (a) a direct mapping transformation (possibly including filters and/or derivations); (b) a union transformation; (c) a join transformation (possibly including single and/or repeating data); (d) a horizontal to vertical unpivot transformation; and (e) a vertical to horizontal pivot transformation. The different transformation types are described below in greater detail. In certain embodiments, the data lineage trace can be generated to include the data lineage through one or more staging tables that are created to store data for multi-step transformations. According to the embodiment, staging tables are tables of a data warehouse that can be utilized as needed for one or more transformations, and can serve a purpose of acting as an intermediate storage structure for multi-step transformation scenarios.

A direct mapping transformation is a transformation where one or more columns of a source data record in a source table are renamed and/or reordered in a target data record of a target table. In certain embodiments, one or more columns of a source data record in a source table can be propagated unchanged within a direct mapping transformation. A union transformation is a transformation where one or more source data records from two or more source tables are combined into two or more target data records of a single target table, so that the target table includes some or all of the one or more source data records from the two or more source tables. A join transformation is a transformation where one or more source data records from two or more source tables are combined into a single target data record of a single target table, so that the target data record of the target table include all the columns of the one or more source data records from the two or more source tables.

Further, a horizontal to vertical unpivot transformation is a transformation where one or more source data records from a source table are converted into one or more target data records of a target table, where each set of one or more columns of each source data record is transformed into a separate target data record of the target table. For example, if a source table has a single source data record that includes columns A, B, C, then an unpivot transformation transforms the source data record into three target data records: a first target data record that includes column A; a second target data record that includes column B; and a third target data record that includes column C. A vertical to horizontal pivot transformation is a transformation where one or more source data records from a source table are converted into a target data record of a target table, where the one or more source data records are combined into a single target data record. For example, if a source table includes three source data records, data record 1, data record 2, and data record 3, then a pivot transformation transforms the three source data records into a single target data record that includes one or more of the columns of data records 1, 2, and 3. A case transformation is a transformation where data values for a target data record are populated from one or more source columns, which may be from different source tables, based on a condition.

According to an embodiment, data lineage trace information can be made available for display within a user interface of the system. The information that can be provided to the user interface is now described in greater detail according to an example embodiment. For a source lineage of a selected data element, a hierarchy of data elements that produced the selected data element can be provided. This is a path of data elements that traverses through all associated transformations back to the raw source data in the data warehouse. The path can include several path branches through the data. Similarly, for a target lineage of the selected data element, a hierarchy of data elements that are derived from the selected data element can be provided.

According to the embodiment, one or more of the following attributes can be provided for each data element in the path: (a) placement of the data element within the hierarchy (e.g., identity of data element and identity of its parent data element within the hierarchy); (b) data model name; (c) table name; (d) column name; (e) data type of the data element; (f) data element value; (g) preferred source route (yes or no); (h) primary key; (i) indicator whether the data is (or might be) masked data; (j) indicator whether the data is from an internal staging table; (k) indicator that one or more associated objects (such as discrepancies) are primarily linked to the data element; or (l) underlying data (e.g., table object identity, column object identity, surrogate key value, and any other relevant data). A "data model" is a data schema associated with one or more data tables of a data warehouse.

FIG. 3 illustrates a data lineage of patient data related to a series of medical studies, according to an embodiment of the invention. However, in other embodiments, the data can be any type of life sciences or medical data. Further, in other embodiments, the data can be any type of data. According to the illustrated embodiment of FIG. 3, a data warehouse can include four data models: source data model 310, all sites data model 320, review data model 330, and analysis data model 340. Source data model 310 includes three tables: demography table 311, site A visits table 312, and site B visits table 313. Demography table 311 includes demographic data for all subjects in a study, where the demographic data includes each subject's height and height unit. Site A visits table 312 includes one data record per visit (i.e., visit data) for each subject at study site A, where the visit data includes the subject's weight and weight unit. Site B visits table 313 includes one data record per visit (i.e., visit data) for each subject at study site B, where the visit data includes the subject's weight and weight unit. All sites data model 320 includes one table: visits table 321. Visits table 321 is a union of site A visits table 312 and site B visits table 313 that is created by a union transformation of the visit data included within site A visits table 312 and the visit data included within site B visits table 313. Review data model 330 includes one table: milestone visits table 331. Milestone visits table 331 is a subset of important visits for each patient that is derived from the visit data including within visits table 321 using a source filter transformation (e.g., visits 1, 4, 7, and 10 for each subject). Analysis data model 340 includes one table: BMI table 341. BMI table 341 is a join of demography table 311 and milestone visits table 331 that is created by a join transformation of the demographic data included within demography table 311 and the visit data included within milestone visits table 331, where a body mass index ("BMI") value is a derivation using the subject's weight, weight unit, height, and height unit.

FIG. 4 illustrates an example user interface that displays a data lineage 400, according to an embodiment of the invention. According to the example embodiment, BMI table 341 of FIG. 3 can include the following data:

| Study | Subject | Visit | Site | Gender | Age | AgeU | BMI | BMIU |
|---|---|---|---|---|---|---|---|---|
| BMI | 1001 | 4 | MGH | FEMALE | 34 | YEARS | 22.7 | KG/M**2 |
| BMI | 1002 | 4 | MGH | FEMALE | 24 | YEARS | 24.5 | KG/M**2 |
| BMI | 1003 | 4 | MGH | MALE | 42 | YEARS | 21.9 | KG/M**2 |
| BMI | 1004 | 4 | MGH | MALE | 28 | YEARS | 26.3 | KG/M**2 |
| BMI | 1005 | 4 | MGH | FEMALE | 34 | YEARS | 24.6 | KG/M**2 |
| BMI | 1006 | 4 | MGH | FEMALE | 29 | YEARS | 28.8 | KG/M**2 |
| BMI | 1007 | 4 | McLean | FEMALE | 42 | YEARS | 33.3 | KG/M**2 |
| BMI | 1008 | 4 | McLean | FEMALE | 35 | YEARS | 22.5 | KG/M**2 |
| BMI | 1009 | 4 | McLean | MALE | 34 | YEARS | 33.6 | KG/M**2 |
| BMI | 1010 | 4 | McLean | FEMALE | 54 | YEARS | 30.6 | KG/M**2 |

According to the embodiment, a system can display the above data within a user interface of the system. A user of a system may want to investigate the source data for Subject 1007, a female, age 42, with a BMI value of 33.3. The user can select the data value 33.3 for Subject 1007 within the user interface and indicate that the user wishes to review the source data lineage of the data value. In response, the system can display data lineage 400 of FIG. 4 within the user interface, which is further described in greater detail.

According to the illustrated embodiment, data lineage 400 includes a plurality of rows (i.e., rows 401, 402, 403, 404, 405, 406, 407, 408, and 409), where each row includes information about one of the source data elements. The rows traverse the paths through the set of transformations shown in FIG. 3. Thus, the immediate ancestor data elements are at a hierarchy level below the selected data element within data lineage 400, and their ancestors follow in a similar fashion. Thus, the hierarchy path is traversed from the data elements closest to the selected data element upstream to raw source data elements. Therefore, in the illustrated embodiment of FIG. 4, row 401 represents the selected data element (i.e., the data value 33.3 for Subject 1007). Rows 402, 403, 404, and 407 represent immediate ancestor data elements for the data element represented by row 401. Thus, the immediate ancestor tables of the selected data element represented by row 401 are demography table 311 and milestone visits table 331 of FIG. 3. Row 405 represents an immediate ancestor data element for the data element represented by row 404. Row 406 represents an immediate ancestor data element for the data element represented by row 405. Row 408 represents an immediate ancestor data element for the data element represented by row 407. Row 409 represents an immediate ancestor data element for the data element represented by row 408. Thus, the immediate ancestor table of the data element represented by row 404, and the data element represented by row 407, is visits table 321. Further, the immediate ancestor table of the data element represented by 405, and the data element represented by row 408, is site B visits table 313. While data lineage 400 is an example of a source data lineage, a target data lineage can be displayed within the user interface in an alternate embodiment, where one or more descendant data elements for a selected data element can be displayed, where the target data lineage includes a plurality of rows, and where each row includes information about one of the target data elements.

Data lineage 400 further includes a plurality of columns (i.e., columns 410, 420, 430, 440, and 450). Column 410 represents a data model name, table name, and column name of the data element. Column 420 represents a data value of the data element. Column 430 represents a data type and size of the data element. Column 440 represents an indication of whether the data element is part of a preferred source path (i.e., "Yes" or "No"). Column 450 represents a primary key value for the data element.

Thus, data lineage 400 can be a tree table that displays a hierarchy of data elements, where the column headings are static, and a user can open or close portions of the hierarchy using tree table components. Further, in one embodiment, a data element that is linked to an associated object (illustrated in FIG. 4 as data element 460) can be highlighted with a background color. The highlighted background color can represent a primary link between a data element and an associated object. In the instance of a primary link, the user can select a highlighted data element and request to display the details of the associated object linked to the data element.

In one embodiment, if data lineage 400 includes a path through an internal staging table, a corresponding data value can be marked with a symbol, such as an asterisk (not illustrated in FIG. 4). Further, a footnote can be displayed below data lineage 400 explaining the meaning of the symbol. Additionally, in one embodiment, if a data element is from a table or column where security has been applied to the table or column, and masked data is displayed in place of actual data, then the data element can be marked with a symbol, such as the symbol "§" (illustrated in FIG. 4 as symbol 470). Further, a footnote can be displayed below data lineage 400 explaining the meaning of the symbol. In addition, in one embodiment, a full data lineage trace may not be able to be completed, either because the user does not have access to some of the data in the path of the trace (either upstream or downstream), due to security applied to the data, or because a data record has been deleted from a table and the deletion has not yet been propagated to downstream tables. In either case, according to the embodiment, the user interface can display a message that indicates that the data trace has been terminated (not illustrated in FIG. 4).

Thus, in one embodiment, a user of a system can navigate through a data browser to a data listing page and select a data element on a data grid that is displayed within a user interface. A "data grid" is a display that presents rows and columns of a data table, or a view of data. In selecting the data element, the user can indicate that the user desires to see the source data that the selected data element is derived from. In response, the system can obtain a collection of source data elements, and display a collection of source data element values along with corresponding information about a data model, table, and column for each source data element. The collection can be organized and include information so that the collection can be displayed in a user interface as a tree of paths that make up the source data for the selected data element. Information can also be included so that a preferred source path can be displayed.

In another embodiment, a user can navigate through a data browser to a data listing page and select a data element on a data grid that is displayed within a user interface. In selecting the data element, the user can indicate that the user desires to see the target data that is derived from the selected data element. In response, the system can obtain a collection of target data elements, and display a collection of target data element values along with corresponding information about a data model, table, and column for each target data element. The collection can be organized and include information so that the collection can be displayed in a user interface as a tree of paths that make up the target data for the selected data element.

Further, with respect to associated objects, in one embodiment, an associated object that is created within a data warehouse, or otherwise associated with a data element of the data warehouse, can be viewed in upstream or downstream data models as though these objects have been propagated to the different associated models. The system can automatically associate an associated object created in one data model with its corresponding source and target data elements in other data models. The associations between the associated objects and the data elements in the source and target data models can be displayed within a user interface of the system, where the existence of associated objects can be displayed along with associated data elements as well as associated object categories. Further, when multiple source data elements are used to derive a target data element, then one of the source data elements can be selected, during transformation definition, as a preferred source data element. The preferred source data elements can form a data lineage path upstream through source data. The most upstream source data element can be used to export an associated object to an external system. Further, when data associated with an associated object is updated, one or more flags of the associated object can be set to indicate that the data has been updated.

As previously described, links between data elements and associated objects can be made available for display within a user interface that displays data lineage 400. Information that is provided to the user interface by the system for identifying data elements or data records that have associated objects that are associated with the data elements or data records is now further described in greater detail. The system can provide information to the user interface so that each data element that has an associated object associated with the data element is highlighted in the display. This can include the data elements in a table where an associated object is originally created, or otherwise associated, (i.e., a primary link).

In one embodiment, the system can provide: (a) an associated object identity (which can be used to access the associated object and its properties); (b) a data element reference (such as a table object identity, a column object identity, and a surrogate key); (c) an indication whether the associated object that is associated with the data element is a primary link or a secondary link; (d) an indication whether the link is in the source path or target path of the primary data element (for a secondary link); and (e) a state of the associated object. According to the embodiment, as illustrated in FIG. 4 by data element 460, the system can highlight a data element with a background color to indicate that the data element is linked to an associated object. The system can highlight the data element using a first background color to indicate a primary link. Alternatively, the system can highlight the data element using a second background color to indicate a secondary link. As previously described, a user is able to request a source or target lineage of a data element where an associated object is linked. When a user reaches a data element that includes a primary link to the associated object, the user can view the associated object, including one or more characteristics of the associated objects. The user can also export the associated object to an external source. In alternate embodiments, rather than highlighting a data element with a color to indicate that the data element is associated with an associated object, the system can use an alternate indication. Some examples of alternate indications include, but are not limited to, an icon, a colored border, or an audio indication.

Thus, in one embodiment, a user of a system can navigate to a data listing, select a data element on a data grid that is displayed within a user interface, create an associated object, and associate the associated object with the selected data element. The system can then associate the associated object with data elements that are related to selected data element. The system can link the newly created associated object to the selected data element, and designate the link as a primary link. The system can further recursively find all source and target data elements for the selected data element by using column mapping data and record mapping data associated with the existing transformations within the data warehouse. The system can subsequently link the same associated object to the related source and target data elements, and designate these links as secondary links. Thus, in each related source or target data model, a data element with a secondary link to the associated object can be highlighted within the user interface of the system.

In another embodiment, a user of the system can navigate to a data listing, where the system can provide primary links and secondary links between associated objects and primary source data. The system can further obtain properties from the associated objects, such as a state of each associated object, to filter the display. In yet another embodiment, a user can delete a data element that includes links to one or more associated objects. The system can remove the primary and/or secondary links to associated objects associated with the deleted data. When the data for a primary link is deleted, the system can remove the primary and secondary links to an associated object that is associated with a data element, and the system can delete the associated object. When the data for a secondary link is deleted, the system can remove the secondary link and determine if further links should be removed (and remove any further links as necessary). In a further embodiment, the system can allow a user to create a query that can access the column mapping data as well as the linked associated objects to support visibility of the associated objects.

In a flow of control for a data lineage propagation module (such as data lineage propagation module 200 of FIG. 2), according to one embodiment, one or more data models can be defined within a data warehouse. Metadata for each data model is created or loaded. One or more transformations are defined for one or more target tables using a transformation module (such as transformation module 225 of FIG. 2). One or more auxiliary columns are added to each target table as required for the particular transformation. These auxiliary columns are further described below in greater detail. Subsequently, a data lineage mapping table is populated with data lineage tracing information (i.e., metadata information) regarding column mapping, which is distinct from the data stored within the one or more data tables of the data warehouse, and where the data lineage mapping table is further described below in greater detail. The auxiliary column identity is part of the column mapping metadata so that mapped target columns can be linked with the auxiliary column that holds the identity of the source table record for the mapped source column. The one or more data models are installed with one or more tables. One or more source tables are loaded with data. The transformations are executed and populate one or more target tables. Subsequent to the one or more target tables being loaded with data, a shadow table is populated or updated with data lineage tracing information (i.e., record mapping information), which is also distinct from the data stored within the one or more data tables of the data warehouse, where the shadow table is further described below in greater detail. Finally, one or more secondary links for associated objects are propagated within the data. The secondary links can be used to obtain an association of an upstream or downstream data element with an associated object without traversing the data lineage tracing information of the data lineage mapping table and the shadow table in order to detect an existence of the associated object.

Thus, according to an embodiment, a data lineage propagation module (such as data lineage propagation module 200 of FIG. 2) can maintain one or more associations, and can trace between, two types of objects: (a) a data element of a data record in a table; and (b) a complete data record in a table. Regarding (a), the following can be used to uniquely identify a data element, and also to trace the names of installed objects when needed for obtaining data elements: (1) a model object identity that identifies a data model of the data warehouse; (2) a table instance object identity that identifies a table of the data warehouse; (3) a surrogate key value that identified a surrogate key; and (4) a column object identity that identifies a column of the table. Regarding (b), some associated objects can be linked to a data record rather than a specific data element within the data record. In this scenario, since there is no specific column within the data record, a column object identity for a surrogate key is used, rather than a column object identity that identifies a column of the table. Thus, the following can be used to uniquely identify a data record: (1) a model object identity that identifies a data model of the data warehouse; (2) a table instance object identity that identifies a table of the data warehouse; (3) a surrogate key value that identified a surrogate key; and (4) a column object identity for the surrogate key. In an alternate embodiments, a unique table identifier that uniquely identifies a table of the data warehouse (across all data models of a data warehouse) can be used to uniquely identify a data record.

Further, according to the embodiment, the data lineage propagation module maintains and propagates associations with associated objects. The data lineage propagation module further provides two types of relationship mappings: (a) a mapping of a specific data element to one or more source or target data elements (i.e., data lineage traceability); and (b) a mapping between associated objects and data elements or data records (i.e., associated objects visibility).

According to the embodiment, in order to provide data lineage traceability, the data lineage propagation module populates a data lineage mapping table with data lineage tracing information, after one or more tables are defined with a data warehouse. A data lineage mapping table is further described below in greater detail. As one or more transformations are executed within the data warehouse, one or more auxiliary columns are populated, and a shadow table is loaded with data lineage tracing information for tracing the data lineage of one or more data elements. The auxiliary columns and the shadow table are further described below in greater detail. As associated objects are created and/or associated with a data element, the data lineage propagation module can index associated objects that are associated with source and target data elements for efficient visualization by other processes. Thus, an association of an upstream or downstream data element with the associated object can be directly obtained without traversing the data lineage tracing information of the data lineage mapping table and the shadow table.

During data model and transformation definition phases, a target table of a transformation can be identified, and one or more auxiliary columns can be added to the identified table as one or more metadata definitions. The number of auxiliary columns can depend on the type of transformation. The main use of the one or more auxiliary columns is to store source surrogate key values from the source table of the transformation. A surrogate key, as previously described, is an identity of a data record, where a source surrogate key is an identity of a source data record. The one or more auxiliary columns can be populated with one or more source surrogate key values, or other data values appropriate for the transformation. The data lineage propagation module can use the surrogate key values (or other appropriate data values) stored within the auxiliary columns to trace back through a path of source data elements that contribute to the target data.

As previously described, one or more auxiliary columns can be added to one or more target tables as required for a specific transformation. Examples of auxiliary columns that can be added for different types of transformations are as follows:

| Transformation | Auxiliary Columns |
| --- | --- |
| Union | 1 Source Surrogate Key column (Source Surrogate Key can contain a source table identity as its first component) |
| Join | Source Surrogate Key columns: one for each table that contributes to the join |

| Transformation | Auxiliary Columns |
|---|---|
| Horizontal to Vertical Unpivot | 1 Source Surrogate Key column |
| Vertical to Horizontal Pivot | 1 Source Surrogate Key column (values can be modified to hold Surrogate Key root, i.e., with a placeholder for the position that holds pivot column values) |
| Direct Map | 1 Source Surrogate Key column (this can include direct-map type derivations) |
| Case Selection | Source Surrogate Key columns: one column for the filter value (case identifier) that links to the source table and column, and one column for the Source Surrogate Key |

According to the embodiment, tracing the data lineage of a data element is dependent on one or more surrogate keys. Each table can include a surrogate key column, which can serve as an indexed unique key for the table. In order to trace from a target table of a transformation back to a source table, the surrogate keys from the source table are stored in the target table. In an example of a simple transformation, in order to trace a source data element for a selected data element in a target table, the target table is looked up in a data lineage mapping table (described below in greater detail) in order to obtain a source table, source column, and auxiliary column where a source surrogate key is stored. Using the auxiliary column, a value of the source surrogate key is obtained and stored in the target table record that contains the selected data element. The source table, source column, and source surrogate key value is used to find the source data value for the selected target data element. Data lineage tracing for more complex transformations are described below in greater detail.

In order to trace a target data element for a selected source data element, a separate table of data lineage tracing information, identified as a shadow table (described below in greater detail) is maintained. The shadow table includes one or more mappings of a source data record to a target data record. More specifically, the shadow table can include de-normalized source record-target record mapping using a particular source key together with a context map identifying metadata relationship between columns and source keys. Thus, according to the embodiment, at the end of an execution of a transformation, the shadow table can include one or more system records that provide an indexed version of mapping data that allow a target data element to be traced from a source data element using the data lineage mapping table.

Figure 5:
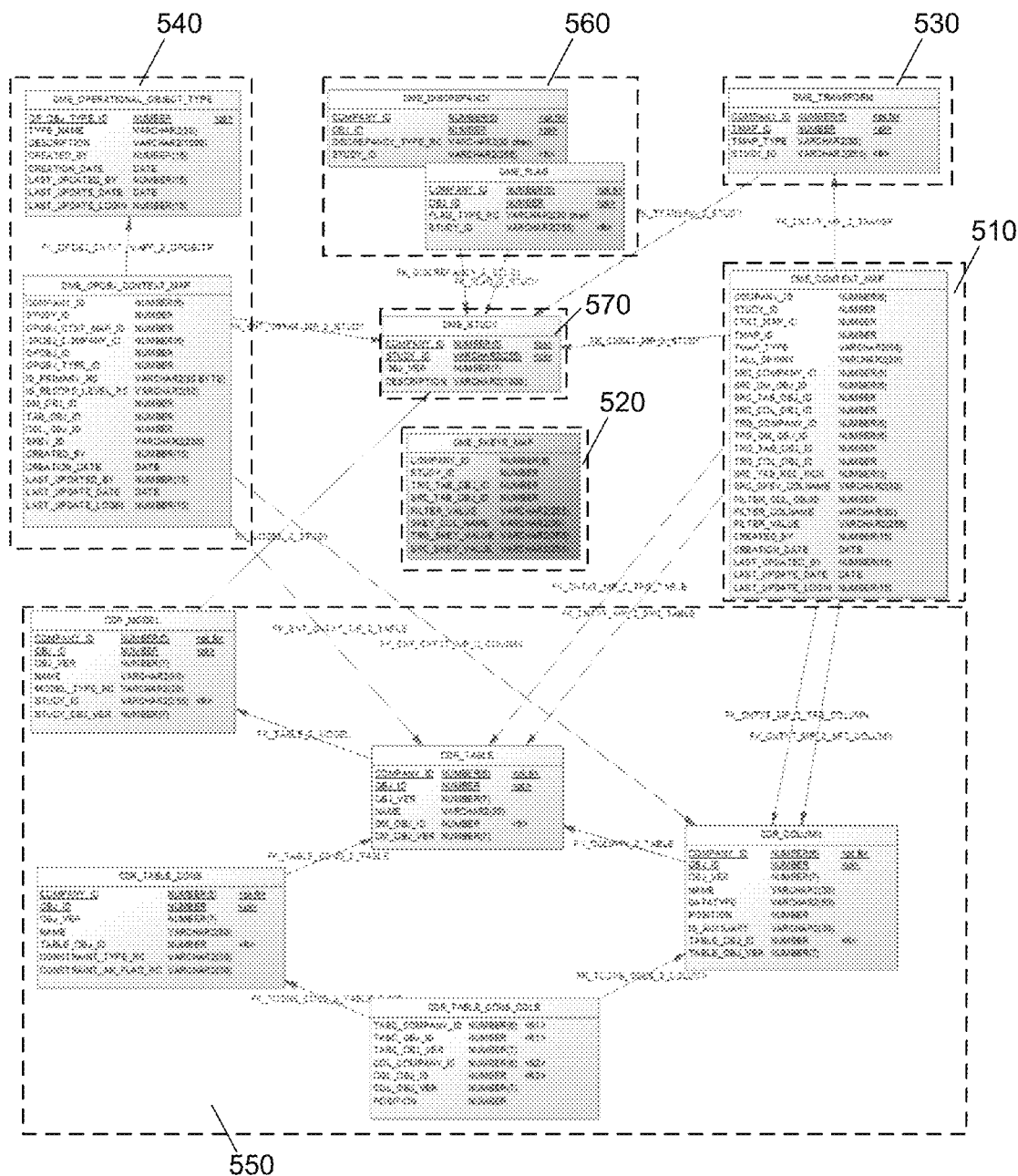
FIG. 5 illustrates a block diagram of a physical model for a system, according to an embodiment of the invention.

FIG. 5 illustrates a block diagram of a physical model for a system, according to an embodiment of the invention. FIG. 5 illustrates a representative physical model for a system. In certain embodiments, a system may not include all the components of the physical model illustrated in FIG. 5. In other embodiments, a system may include additional components that are not illustrated in FIG. 5. A data lineage propagation module (such as data lineage propagation module of FIG. 2) can include a physical model that includes one or more components, where each component includes one or more tables. In the illustrated embodiment of FIG. 5, the physical model includes data lineage mapping component 510, which includes data lineage tracing information (i.e., metadata information) for tracing source data elements from target data elements. Data lineage mapping component 510 includes a data lineage mapping table, which is further described below in greater detail in relation to FIG. 6. Further, the physical model includes shadow table component 520, which includes indexed data lineage tracing information for tracing target data elements from source data elements. Shadow table component 520 includes a shadow table, which is further described below in greater detail in relation to FIG. 7. Additionally, the physical model includes transformations component 530, which includes data for one or more transformations. Further, the physical model includes associated object mapping component 540, which includes data regarding links between associated objects and data elements or data records. Associated object mapping component 540 includes an associated object mapping table, which is further described below in greater detail in relation to FIG. 9. Additionally, the physical model includes table definition component 550, which includes application table definitions for one or more source tables and one or more target tables. In one embodiment, table definition component 550 can include one or more application table definitions at the data model level (e.g., table "CDR_MODEL" in FIG. 5), one or more application table definitions at the table level (e.g., tables "CDR_TABLE," "CDR_TABLE_CONS" and "CDR_TABLES_CONS_COLS" in FIG. 5), and one or more application table definitions at the column level (e.g., tables "CDR_COLUMN" and "CDR_TABLES_CONS_COLS" in FIG. 5). Further, the physical model includes associated object component 560, which includes table definitions for one or more associated objects. In one embodiment, associated object component 560 can include one or more table definitions for one or more discrepancies (e.g., table "DME_DISCREPANCY" in FIG. 5), and one or more table definitions for one or more flags (e.g., table "DME_FLAG" in FIG. 5). Additionally, the physical model includes study component 570, which is a parent object that groups all of the other objects in the physical model.

Together, data lineage mapping component 510, shadow table component 520, and transformations component 530, along with table definition component 550, provide a data lineage subsystem, which is further described below in greater detail in relation to FIG. 8. Further, associated object mapping component 540, along with table definition component 550 and associated object component 560, provide an associated information subsystem, which is further described below in greater detail in relation to FIG. 10.

FIG. 6 illustrates a block diagram of a data lineage mapping table 600, according to an embodiment of the invention. Data lineage mapping table 600 includes information for tracing a source data element from a target data element. The information for tracing a source data element from a target data element is data lineage tracing information (i.e., metadata information), which is distinct from the data stored within the one or more data tables of the data warehouse. Data lineage mapping table 600 can be populated during a data model publishing phase, and data lineage mapping table 600 includes information for tracing between a source data element and a target data element for each data transformation. Data lineage mapping table 600 stores references, by object identity, to a transform column level map object, a target table and column, a source table and column, an auxiliary column that holds a source surrogate key, and any additional information required for a specific transformation.

According to an embodiment, the information stored within data lineage mapping table 600 makes up a first major portion of data lineage tracing information used to trace a data lineage. A second major portion of data lineage tracing information used to trace a data lineage is one or more auxiliary columns that are added to table definitions of target tables of transformations to trace back to source data records. The auxiliary columns can contain surrogate keys from each source table that contribute to the data record in the target table. When necessary, the auxiliary columns can hold a table identity of the source table and/or identifying "filter" values for a specific transformation. Data lineage mapping table 600 and the one or more auxiliary columns include the data used by a data lineage propagation module (such as data lineage propagation module 200 of FIG. 2) to trace back from a target data element to a source data element. A third major portion of data lineage tracing information used to trace a data lineage is a shadow table, which is further described in greater detail in relation to FIG. 7.

In the illustrated embodiment of FIG. 6, data lineage mapping table 600 (which includes column mapping data) includes a "TMAP_ID" column which corresponds to a transform table level map identity (i.e., identifies a transformation). Data lineage mapping table 600 further includes a "TMAP_TYPE_RC" column which defines how source columns are related to target columns (i.e., identifies a transformation type). Data lineage mapping table 600 further includes a "SRC_DM_OBJ_ID" column which corresponds to a source data model identity, a "SRC_TAB_OBJ_ID" column which corresponds to a source table identity, and a "SRC_COL_OBJ_ID" column which corresponds to a source column identity. Data lineage mapping table 600 further includes a "TRG_DM_OBJ_ID" column which corresponds to a target data model identity, a "TRG_TAB_OBJ_ID" column which corresponds to a target table identity, and a "TRG_COL_OBJ_ID" column which corresponds to a target column identity. Data lineage mapping table 600 further includes a "SRC_SKEY_COL_OBJ_ID" column which corresponds to an object identity for an auxiliary column in a target table, which stores a source table data record surrogate key for the source table identified by the source table identity stored within the "SRC_TAB_OBJ_ID" column for the data record. According to the illustrated embodiment, data lineage mapping table 600 further includes a "FILTER_COL_OBJ_ID" column which optionally provides information about a filter column identity in either a source table or a target table for certain transformation types, and a "FILTER_VALUE" column which optionally provides information about a filter value in a table filter column for certain transformation types.

FIG. 7 illustrates a block diagram of a shadow table 700, according to an embodiment of the invention. Shadow table 700 is an optimized central index that can provide efficient lookup of data lineage tracing information when tracing from a source data element to a target data element. Shadow table 700 can allow data lineage processing to resolve source record-target record relationships directly in a single table without having to create separate queries for each data table within a data warehouse. Such data lineage processing can be more efficient by several orders of magnitude. Further, shadow table 700 can extract source record-target record relationships from the one or more data tables of the data warehouse, and can act as an index for traversing a lineage of the one or more data tables without querying the data tables themselves.

In the illustrated embodiment of FIG. 7, shadow table 700 includes a "TRG_TAB_OBJ_ID" column which corresponds to a target table instance identity. Shadow table 700 further includes a "SRC_TAB_OBJ_ID" column which corresponds to a source table instance identity. Shadow table 700 further includes a "SRC_SKEYCOL_OBLID" column which corresponds to an object identity for an auxiliary column in a target table, which stores a source table data record surrogate key. Shadow table 700 further includes a "TRG_SKEY_VALUE" which corresponds to a surrogate key value of a target table data record, and a "SRC_SKEY_VALUE" which corresponds to a surrogate key value of a source table data record that is also a value for an auxiliary column of the aforementioned target table data record. According to the illustrated embodiment, shadow table 700 further includes a "FILTER_VALUE" column which optionally provides information about a filter value in a table filter column for certain transformation types.

Figure 8:
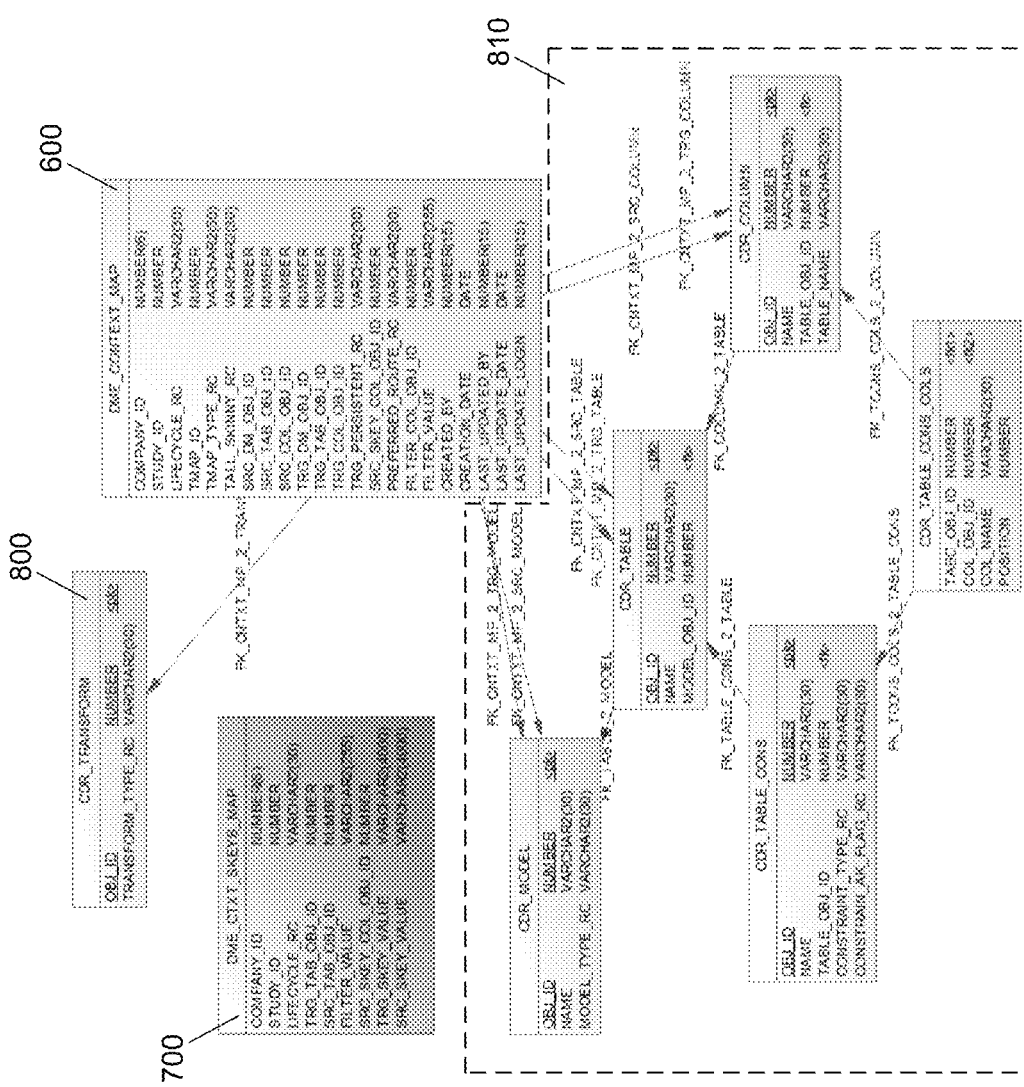
FIG. 8 illustrates a block diagram of a physical model of a data lineage subsystem, according to an embodiment of the invention.

FIG. 8 illustrates a block diagram of a physical model of a data lineage subsystem, according to an embodiment of the invention. In the illustrated embodiment of FIG. 8, the physical model includes data lineage mapping table 600 of FIG. 6 and shadow table 700 of FIG. 7. The physical model further includes transformation type table 800 which includes data representing one or more transformation types. Additionally, the physical model includes table definition component 810, which includes table definitions for one or more source tables and one or more target tables, where source tables and target tables are examples of data tables. In the illustrated embodiment, table definition component 810 can include one or more table definitions at the data model level (e.g., a "CDR_MODEL" table in FIG. 8), one or more table definitions at the table level (e.g., "CDR_TABLE," "CDR_TABLE_CONS" and "CDR_TABLES_CONS_COLS" tables in FIG. 8), and one or more table definitions at the column level (e.g., "CDR_COLUMN" and "CDR_TABLES_CONS_COLS" tables in FIG. 8).

According to the embodiment, when data is generated within, or loaded into, a data warehouse, and when one or more transformations have been defined for the data warehouse, a data lineage propagation module (such as data lineage propagation module 200 of FIG. 2) can generate data lineage tracing information within the physical model of the data lineage subsystem. More specifically, for each transformation of the one or more transformations, the data lineage propagation module can store each target-to-source mapping within data lineage mapping table 600. The data lineage propagation module can further map one or more target data values of one or more target tables to one or more source data values of one or more source tables. The data lineage propagation module can further add one or more auxiliary columns to the one or more target tables by modifying one or more table definitions of table definition component 810, where each auxiliary column can store a source surrogate key that identifies a source table. Further, for each transformation of the one or more transformations, the data lineage propagation module can store each source-to-target mapping within shadow table 700. The data lineage propagation module can further map one or more source data values of one or more source tables to one or more target data values of one or more target tables.

With respect to the one or more target-to-source mappings stored within data lineage mapping table 600, the data lineage propagation module can store the following information for each target column data value in data lineage mapping table 600: (a) a source table instance object identity and a source column object identity; (b) a target table instance object identity and a target column object identity; (c) an object identity of each auxiliary column that has been added to the target table, where each auxiliary column stores a source surrogate key value for a source data record used to produce the target data value; and (d) any additional data required for the mapping, such as an indicator (e.g., flag) that the mapping is a preferred source route. If a same source data record is used to populate values in more than one target column, then the same auxiliary column that stores the source surrogate key column identity can be repeated in multiple mapping system records within data lineage mapping table 600.

Data lineage tracing information can provide support for transformations of a data warehouse, where example transformation types include direct map transformations, conversion transformations, derivation transformations, union transformations, vertical-to-horizontal pivot transformations, horizontal-to-vertical pivot transformations, case transformations, and custom types of transformations. In certain embodiments, data lineage tracing information can be produced using a data lineage mapping technique. The data lineage mapping technique involves mapping one or more source columns to a target column, and adding one or more auxiliary columns to hold one or more source surrogate keys, where each source surrogate key corresponds to a source table that contributes to the values of the target column.

Direct map transformations, conversion transformations, and derivation transformations can produce straightforward entries in data lineage mapping table 600 using the data lineage mapping technique: one or more source columns map to each target column. These transformations often map from a single source table to a single target table, so there is often just a single auxiliary column that stores source surrogate key values.

Data lineage tracing information can also be used to support union transformations and case transformations using the data lineage mapping technique. However, the data lineage mapping technique can require more than one auxiliary column per transformation to ensure correcting tracing to the source data elements. For example, in a union of five source tables into one target table, any data record in the target table could be from any of the five source tables. To avoid ambiguity in identifying an origin of a particular data record, the target table can be extended to include five auxiliary columns (one per source table). When a union transformation is executed, a source data record surrogate key is inserted into an auxiliary column which mapped to the correct source table. Thus, for each data record in the target table, only one of the five auxiliary columns would contain a source surrogate key value, and the other four auxiliary columns would remain empty.

The same scenario can apply for a case transformation. In a case transformation, the values from different data records in one column of the target tables may be populated from different source columns, which may be from different source tables. For example, in the first data record, the target case column might be populated from source Tab1.ColX. In the second data record, the target case column might be populated from source Tab1.ColY. In the third data record, the target case column may be populated from source Tab2.ColX. Each assignment is controlled by the condition of the case transformation. Thus, each source table and column combination that might be used to populate a target column must be identified in order to trace between source and target data elements. One auxiliary column would be added for each possible source table and column combination. As with the union transformation, only one of the auxiliary columns will be populated with a value in each data record depending on which case condition is true for that data record. Further, there will be multiple column data mappings to the target column, where each mapping source record includes a different source key column identity.

The data lineage mapping technique can be modified to support vertical-to-horizontal pivot transformations and horizontal-to-vertical pivot transformations. The modification can involve storing additional information within data lineage map table 600, e.g., information about a pivot column and a list of filter values used for the transformation. For example, the vertical-to-horizontal pivot transformation can take multiple data records as input, each with a different "filter" value in the "pivot" column, and can create multiple columns in the target table, one or more columns for each of the "filter" values. The result can be a target table where multiple source data records contributed to a single data record. Therefore, multiple auxiliary columns can be added to the target table, one or more columns for each of the source data records that contribute to the target data record.

In certain embodiments, advanced techniques can be used to store data lineage mapping data. In one advanced technique, for a union transformation, an advanced technique for storing data lineage mapping data can involve including a source table instance object identity within a source surrogate key stored within an auxiliary column. An algorithm to trace back to a source data record from a target data record can use the source surrogate key value stored within the auxiliary column of the target data record to look up the source data record in the specified source table, where the source table can be extracted from the source surrogate key value. For both union transformations and case transformations, another advanced technique for storing data lineage tracing information can involve including a "filter" auxiliary column that stores a "filter value" and another auxiliary column that stores a source surrogate key. For union transformations, the "filter" auxiliary column that stores the "filter value" stores a source table instance object identity. Thus, an algorithm to trace back to a source data record from a target data record can use the source surrogate key value stored within the auxiliary column of the target data record to look up the source data record in the source table, where the source table is identified in the "filter" auxiliary column. For case transformations, a user can provide "filter" values, which are text strings, to identify every source table and column combination that might populate a case target column. These "filter" values are stored in data lineage mapping table 600 along with the appropriate source table/column combination and the case transformation target table/column combination. In each data record of the target table, the corresponding "filter value" can be entered into the "filter" auxiliary column. Thus, an algorithm to trace back to a source data record from a target data record can use a source surrogate key value from the target data record, along with the "filter value" and the information stored within data lineage mapping table 600.

To avoid a requirement of multiple auxiliary columns, other advanced techniques can be used to store data lineage tracing information. One advanced technique involves a "smart surrogate key," where a "smart surrogate key" is a concatenation of one or more source surrogate key values, prefixed with a source table identity. As a result, the smart surrogate key can be used to obtain the source table identity, and therefore, a separate auxiliary column to store the source table identity is not required. Further, only a single auxiliary column would be required to store the smart surrogate key, thereby removing the requirement for multiple auxiliary columns in the case of union transformations, vertical-to-horizontal pivot transformations and horizontal-to-vertical pivot transformations. Another advanced technique involves including a pivot column value as a "filter value" within the smart surrogate key for the vertical-to-horizontal pivot transformations and horizontal-to-vertical pivot transformations.

According to an embodiment, the aforementioned data lineage tracing information, or other data lineage tracing information, can be leveraged to support the visibility of associated objects that are linked to either data elements or data records, and to propagate the associated objects to related source data elements and target data elements. Further, the aforementioned data lineage tracing information, or other data lineage tracing information, can also be leveraged to support the export of associated objects through a path of transformations within the data lineage to an external source for the data. According to an embodiment, an associated object mapping table can store data about one or more links between associated objects and either data elements or data records. A data lineage propagation module (such as data lineage propagation module of FIG. 2) can identify an association with the associated object and the data element (or data record) where the associated object is created as a primary link, and can further store the primary link within the associated object mapping table. The data lineage propagation module can further create and store secondary links to source and target data elements/data records of the primary data element (or data record). This can provide efficient visualization of the associated object when a user of a system is viewing source or target data as well as when the user views the primary data element (or data record). Thus, according to the embodiment, each associated object can have one primary link, and can have one or more secondary links.

FIG. 9 illustrates a block diagram of an associated object mapping table 900, according to an embodiment of the invention. Associated object mapping table 900 can store data regarding one or more links between associated objects and either data elements or data records. Associated object mapping table 900 can store data regarding a primary link between an associated object and a data element (or data record), where the primary link identifies that the associated object was created for (i.e., originally associated with) the data element (or data record). Further, associated object mapping table 900 can store data regarding a secondary link between an associated object and a data element (or data record), where the secondary link identifies that that the data element (or data record) is either a source or target data element (or data record) of a primary data element (or data record) that is associated with the associated object. The data regarding a primary link between an associated object and a data element, and the data regarding one or more secondary links between an associated object and one or more data elements can be used to obtain an association of an upstream or downstream data element with the associated object. Further, the association can be obtained without traversing a data lineage to detect an existence of the associated object.

In the illustrated embodiment of FIG. 9, associated object mapping table 900 includes an "OPOOBJ_ID" column which corresponds to an associated object identity (i.e., identifies an associated object). Associated object mapping table 900 further includes an "OPOOBJ_TYPE_ID" column which corresponds to an associated object type identity (i.e., identifies a type of the associated object). In alternate embodiments, an identity of an associated object can be a complex identity that includes an identity value, and at least one value.

According to the illustrated embodiment, associated object mapping table 900 further includes a "DM_OBJ_ID" column which corresponds to a data element model identity (i.e., identifies a data model of a data table of a data element that the associated object is associated with). Associated object mapping table 900 also includes a "TAB_OBJ_ID" column which corresponds to a data element table identity (i.e., identifies a data table of a data element that the associated object is associated with). Associated object mapping table 900 further includes a "COL_OBJ_ID" column which corresponds to a data element column identity (i.e., identifies a column of a data element that the associated object is associated with). Associated object mapping table 900 also includes a "SKEY_VALUE" column which corresponds to a data element data record identity (i.e., identifies a data record of a data element that the associated object is associated with). The data element data record identity is also a surrogate key.

According to the illustrated embodiment, associated object mapping table 900 also includes an "IS_PRIMARY_RC" column which identifies whether the association between the associated object and the data element is a primary link or a secondary link. Associated object mapping table 900 further includes an "IS_RECORD_LEVEL_RC" column which identifies whether the associated object is associated with a data element or a data record. Associated object mapping table 900 also includes a "PREFERRED_ROUTE_RC" column which identifies whether the data element is a preferred source data element for the associated object, and whose value is inherited from data lineage mapping table 600. Associated object mapping table 900 further includes a "TRACE_TO_RC" column which identified whether a link between the associated object and the data element is a primary link, a upstream secondary link, or a downstream primary link.

Figure 10:
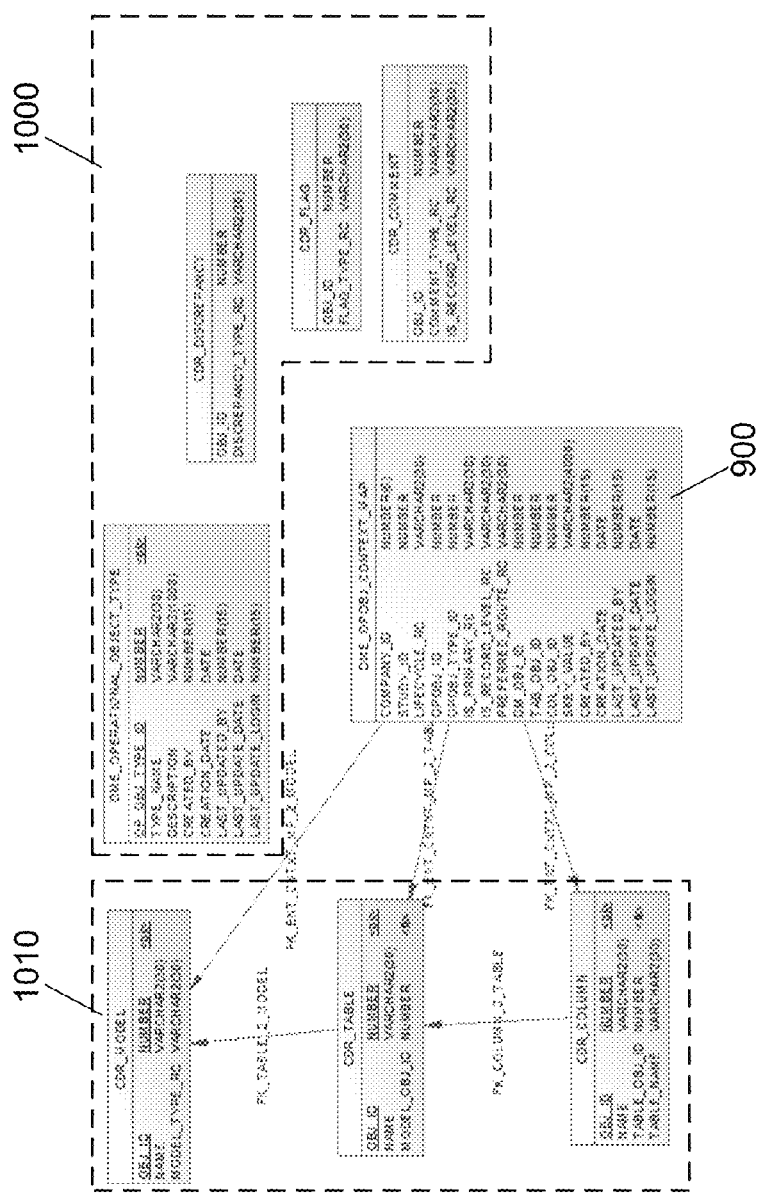
FIG. 10 illustrates a block diagram of a physical model of an associated information subsystem, according to an embodiment of the invention.

FIG. 10 illustrates a block diagram of a physical model of an associated information subsystem, according to an embodiment of the invention. In the illustrated embodiment of FIG. 10, the physical model includes associated object mapping table 900 of FIG. 9. The physical model further includes associated object component 1000 which includes data representing one or more associated objects. In one embodiment, associated object component 1000 can include a table that includes data representing one or more associated object types (e.g., a "DME_OPERATIONAL_OBJECT_TYPE" table in FIG. 10). According to the embodiment, associated object component 1000 can further include one or more tables that include data representing one or more associated objects of a specified associated object type. In the illustrated embodiment, a "CDR_DISCREPANCY" table includes data representing one or more associated objects that are discrepancies, a "CDR_FLAG" table includes data representing one or more associated objects that are status flags, and a "CDR_COMMENT" table includes data representing one or more associated objects that are comments. Additionally, the physical model includes table definition component 1010, which includes table definitions for one or more source tables and one or more target tables. In the illustrated embodiment, table definition component 1010 can include one or more table definitions at the data model level (e.g., a "CDR_MODEL" table in FIG. 10), one or more table definitions at the table level (e.g., a "CDR_TABLE," table in FIG. 10), and one or more table definitions at the column level (e.g., a "CDR_COLUMN" table in FIG. 10).

According to an embodiment, a user of a system, or an automatic program executed within the system, can select a data element, and create an associated object, such as a discrepancy, related to the selected data element. The system can call a data lineage propagation module (such as data lineage propagation module of FIG. 2), and the data lineage propagation module can create a primary association between the new associated object and the selected data element (identified as a primary link). The data lineage propagation module can further store the primary association (i.e., the primary link) within associated object mapping table 900. The data lineage propagation module can further create one or more secondary associations between the new associated object and one or more source data elements and/or target data elements by tracing a full data lineage path from the selected data element to the one or more source data elements and/or target data elements. The data lineage propagation module can further store the one or more secondary associations (i.e., the one or more secondary links) within associated object mapping table 900. In certain scenarios, when tracing upstream to source data elements, multiple source data elements may be mapped to a single target data element. A source data element which is a preferred source data element for the associated object can be identified as such in associated object mapping table 900. The preferred source data element can be identified as a preferred path, and the preferred path data lineage tracing information can be stored in a data lineage mapping table (such as data lineage mapping table 600 of FIGS. 6 and 8).

According to an embodiment, the system can display a presence of an associated object in a display of a data model of a data table in which the associated object was created (or otherwise associated) using the primary link stored within associated object mapping table 900. The system can further display the associated object in upstream and/or downstream data models using the one or more secondary links stored within associated object mapping table 900. When there are multiple source data elements for a particular target data element, the system can mark one or more preferred source data elements as a preferred path. When the system displays a data model, the system can also display the one or more associated objects associated with each data element of the data table of the data model, whether the associated object is associated with the data element by a primary link or a secondary link.

In one embodiment, when a data record is deleted that contains a data element with a primary link to an associated object, a state of the associated object can be modified to a closed state. The data for the associated object can be removed from associated object mapping table 900. Alternatively, the data for the associated object can be retained within associated object mapping table 900, but modified to indicate that the data has been "virtually deleted" (such as associating a "deleted" flag or a timestamp with the data). The associated object can be retained, rather than deleted, and saved for auditing purposes. If a data element associated with an associated object via a primary link is deleted, the primary and all secondary links to the associated object can be deleted, and a state of the associated object can be modified to a closed state. If a data element associated with an associated object via a secondary link is deleted, the secondary link can be deleted.

Additional aspects of tracing a data lineage, as well as propagating visibility of associated information (i.e., associated objects), are now described in greater detail, according to certain embodiments. In certain embodiments, a system can support user or system navigation from any data field on any data record back through source data fields/records in a source-side data lineage until the data lineage reaches source data records/fields that originated in an external system (i.e., source system). The system can then allow the user to choose a source data record (or data field) on which to act. Examples of actions are sending a query or message to the source system about a data record (or data field) value, sending a document, invoking an API that can directly or indirectly take an action on the source system, and opening an application window of the source system with the source data record/field or its manifestation in the source system in context.

An extension to the above functionality involves transformation definition metadata that defines a "preferred source path" from each table (or column) to an immediately preceding source table (or column). This preferred path enables the system to select a single branch of the source lineage at a data record (or data field) that originated in an external system without the user having to explicitly navigate the source data lineage. The system is then able to take the actions described above on that data record (or data field) in the external system.

In other certain embodiments, when displaying data records and their data fields in a user interface, such as a tabular display or a formatted form including displayed fields, an optimized index of associated information (i.e., one or more associated objects), such as an associated object mapping table, can be used to provide a visual indication, such as highlighting or an icon, that associated information is present, for data records and/or data fields that are associated with the associated information.

The system can also allow the user to restrict the information displayed to a subset of the associated information (i.e., one or more associated objects) by some attribute of that information. Examples include types of associated objects (such as discrepancies, error reports, documents, comments) and subtypes of a particular type of associated objects (such as types of documents, statuses of error reports, or categories of tags or status flags). This functionality can be optimized by including, within an associated object table that associates the data record (or data field) with the associated object to all other related data records (or fields), information about the types or subtypes of the associated objects so that the system does not have to look beyond the table itself to perform the restriction.

The system can also allow the user to restrict the associated information (i.e., associated objects) displayed based on a relationship of the data record (or data field) associated with the associated object to the associated object currently displayed. Examples include only displaying associated objects associated with data records (or data fields) upstream of the displayed data element in the data lineage, only displaying associated objects associated with data records (or data fields) downstream of the displayed data element, only displaying associated objects associated directly with displayed data elements (via a primary link), or only displaying associated objects from a specific source or target table or specific set of source tables or target tables. This can be optimized by including, in an associated object table that associates the data record (or data field) associated with the associated object to all other related data records (or data fields), information about a relative position of each associated object so that the system does not have to look beyond the table itself to perform the restriction.

According to certain embodiments, in order to display visual indications of associated information (i.e., associated objects), it can be necessary to efficiently associate each associated object to a specific displayed data field (or data record). In one embodiment, the system can perform the association by using the capabilities of a structured query language ("SQL") to first pivot on an identity for an associated data record such that each associated object is in a tabular format, where a name or identity of each column has the same tabular structure as the information being displayed, and where the data elements in the pivoted table have a data value only when the associated object is present. The system can then use the name or column identity match for a given data record identity between the actual data being displayed and the pivoted table to efficiently turn on an indication of the associated object's presence. In another embodiment, the system can perform the association by separately retrieving the associated object into a local data-structure that has an efficient access method to retrieve information about a particular data record identity or a particular column identity. The system can then efficiently identify data records and data fields in the displayed data lineage by accessing this local data structure using the data record identity or the column identity. In one embodiment, for a data lineage of a data element, the system can also display, for each data record (or data field) in the data lineage, the presence of one or more associated objects.

In certain embodiments, when a user interface of the system displays indications of the presence of one or more associated objects, the system allows the user to invoke an action on a particular data record (or data field) using, for instance, a mouse click, a mouse right-click and menu selection or cursor navigation to the target data record (or data field) and a keyboard action. The invoked actions can include displaying lists of the associated objects and navigations to details about the associated objects. For instance the system can display a popup table of associated comments with an indication for each data table (or data field) to which the comment is attached. Another example can be to display a list of associated discrepancies which can be used to select and display the detailed information about the discrepancy. Further, the system can instead place the user in an interface whether the user can take action on the associated object, such as responding to a comment or changing the status of a discrepancy.

In certain embodiments, the system can use security information about the user's rights and the privileges necessary to access different types of associated objects or the privileges needed to access associated objects attached to particular upstream or downstream data tables to either restrict the visibility of associated objects in the user interface, the level of detail about the associated objects available to the user, or the ability of the user to take action upon the associated objects.

According to certain embodiments, the system can use the tracking timestamp information associated with upstream or downstream data records and the associated objects (such as discrepancies or comments) that are associated with them to enable the user to understand whether the data before or after the data the user is currently viewing is consistent with the upstream or downstream data. For instance, if a user is viewing a data element and invokes a function to show associated comments attached to data in the current data element's data lineage, the system can indicate whether the source data and associated comments in the source data lineage are more recent than the data element and therefore may reflect a change that has not yet propagated to the current data table. Similarly, in the target data lineage, the user can see whether data and associated comments are older than the current data and therefore may reflect data that has not yet been updated to reflect changes that have already been made to the current data element. Another manifestation of the same capability is where the user initiates an action to raise a query on the preferred source data element associated with the current data and the system detects and alerts the user that the source data element has been modified more recently than the current data element. This functionality can prevent the user from taking action through the lineage facility on data which may have already been modified.

As previously described, the system can minimize data storage through the use of surrogate keys and can optimize lookup performance through the use of a shadow table that extracts the source surrogate keys into a single table for optimized lookup. According to one embodiment, an alternative to this design does not require the generation and use of surrogate keys. In this embodiment, a full primary key of a source table is stored within one or more target tables as a source key and additional data fields on the target table are added to hold any auxiliary information captured in the surrogate key such as pivot values or table-selectors associated with the source primary key fields. In this embodiment, system metadata describes each such source key and any functions that operate using the surrogate key operate using the full set of data fields that make up the source key. Further, the optimization that extracts the surrogate key to the shadow table for optimized query performance without having to query each individual table, can be accomplished through the use of a similar shadow table that has a number of columns reserved for each source or target key that are used as needed to hold the values for the components of each source key. The system metadata about the key structure for each table would then enable the system to construct queries against this single shadow table by appropriate joins on the columns used by the particular table to hold the full source key information. An appropriate concatenated index on the set of source keys and another on the set of target keys would optimize performance using the single shadow table.

In certain embodiments, the system can act as an application generator that uses metadata descriptions of one or more applications to generate runtime elements of the data lineage. For example, there can be a user interface in which a user defines a mapping between one or more source tables and a target table. The mapping can differ depending on a type of transformation (e.g., join, pivot, or unpivot). A definition process can record the column-level mapping between one or more source data elements and one or more target data element. Then, as part of deploying the transformation, the system can: (a) add one or more auxiliary columns to the target table before the target table is installed in the database, where the one or more auxiliary columns store one or more source keys; (b) record metadata mapping information about a relationship between the one or more source data elements and the target data element; and (c) generate the computer code that can be executed to perform the transformation. The computer code can include logic to populate the one or more source keys in the target table in order to record the relationship between the one or more source data elements and the target data element. According to certain embodiments, the generated computer code can be re-used in new application deployment of an identical, or similar, structure, without user intervention.

Figure 11:
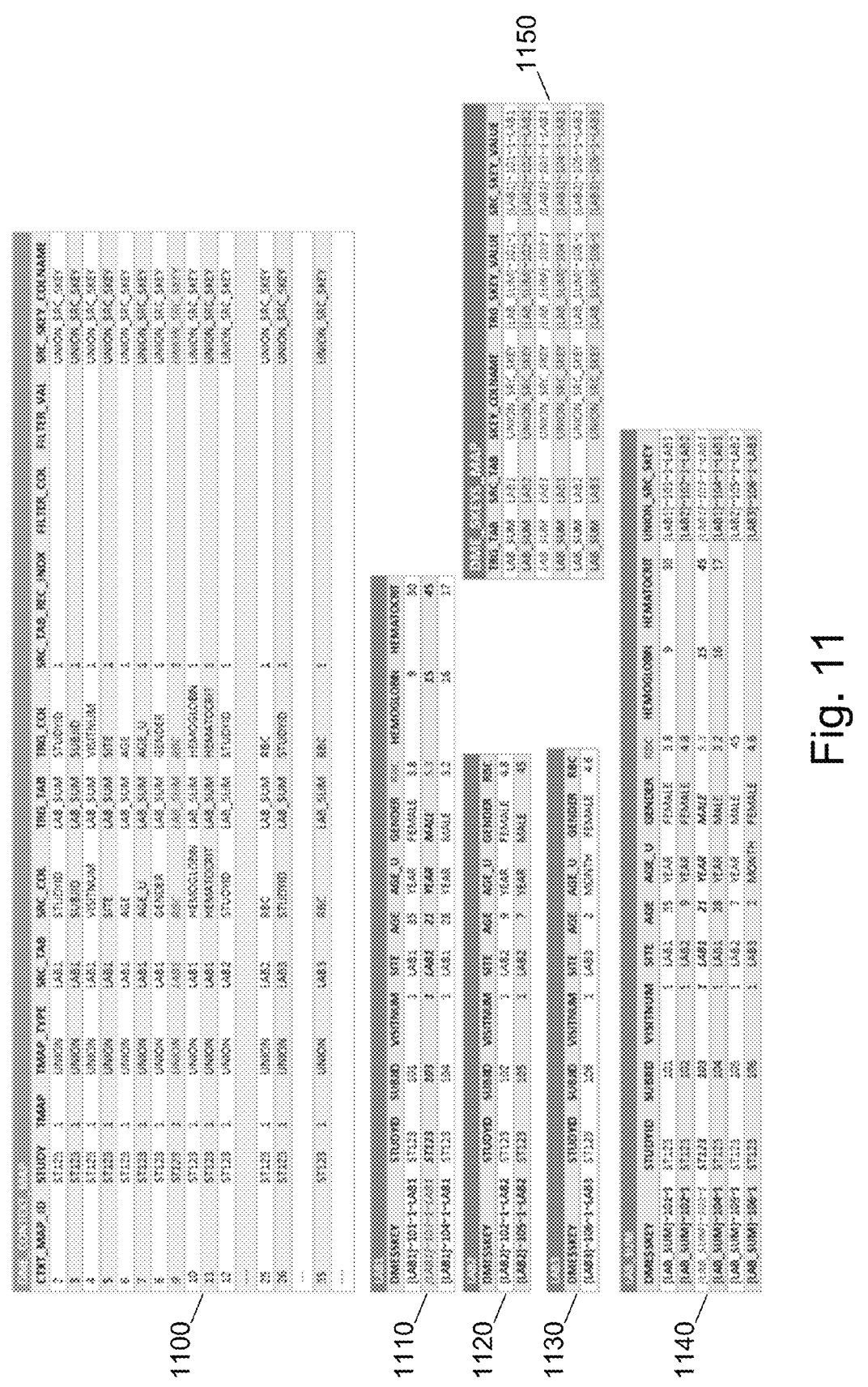

FIG. 11 illustrates an example data lineage trace of a union transformation, according to an embodiment of the invention. In the example embodiment, source tables "LAB1," "LAB2," and "LAB3" (i.e., source tables 1110, 1120, and 1130) are combined into target table "LAB_SUM" (i.e., target table 1140) via the union transformation. Further, in the example embodiment, a data lineage propagation module (such as data lineage propagation module 200 of FIG. 2) can find source data elements for the following target data element in target table 1140: column "RBC" and data record identity (i.e., surrogate key) "[LAB_SUM]~103~1." The data lineage propagation module can look up data lineage mapping table 1100 and find target table "LAB_SUM" (i.e., target table 1130) as a target table, and column "RBC" as a target column, in three system records: system records 9, 25, and 35. These three system records have a transformation map type (i.e., column "TMAP_TYPE") of "UNION" and they store their source surrogate keys in column "LAB_SUM.UNION_SRC_KEY," shown in the "SRC_SKEY_COLNAME" column of data lineage mapping table 1100. In target table 1140, the data lineage propagation module can look in the column "UNION_SRC_KEY" for the target data record. This column contains the value "[LAB1]~103~1~LAB1," and because this is a smart surrogate key, the first component in this value (i.e., "[LAB1]") is the source table identity. Thus, the data lineage propagation module can determine that the source table is source table "LAB1" (i.e., source table 1110). The data lineage propagation module can then return to the three system records found in data lineage mapping table 1100, and, equipped with the knowledge that the source table is source table 1110, the data lineage propagation module can identify the correct system record within data lineage mapping table 1100: system record 9. Thus, the data lineage propagation module can identify that the source data element is in source table 1110, in column "RBC" with a surrogate key value "[LAB1]~103~1~LAB1." The data lineage propagation module can further identify that the source data value is "5.3."

Further, in the example embodiment, the data lineage propagation module can find target data elements for the following source data element in source table 1110: column "RBC" and data record identity (i.e., surrogate key) "[LAB1]~103~1~LAB1." The data lineage propagation module can look in data lineage mapping table 1100 and find source table "LAB1" (i.e., source table 1110) as a source table, and find column "RBC" as a source column, in system record 9. From this information, the data lineage propagation module can determine that it needs to look for the target data element in the "RBC" column of target table 1140. The data lineage propagation module can then search shadow table 1150 using the combination of the target table "LAB_SUM," the source table "LAB1," the SRC_SKEY_COLNAME "UNION_SRC_SKEY," and the source table surrogate key "[LAB1]~103~1~LAB1," to determine that the surrogate key of the desired data record in target table 1140 is "[LAB_SUM]~103~1." Thus, the data lineage propagation module can identify that the target data element is in target table 1110, in column "RBC" of the data record with a surrogate key value "[LAB_SUM]~103~1." The data lineage propagation module can further identify that the target data value is "5.3."

Figure 12:
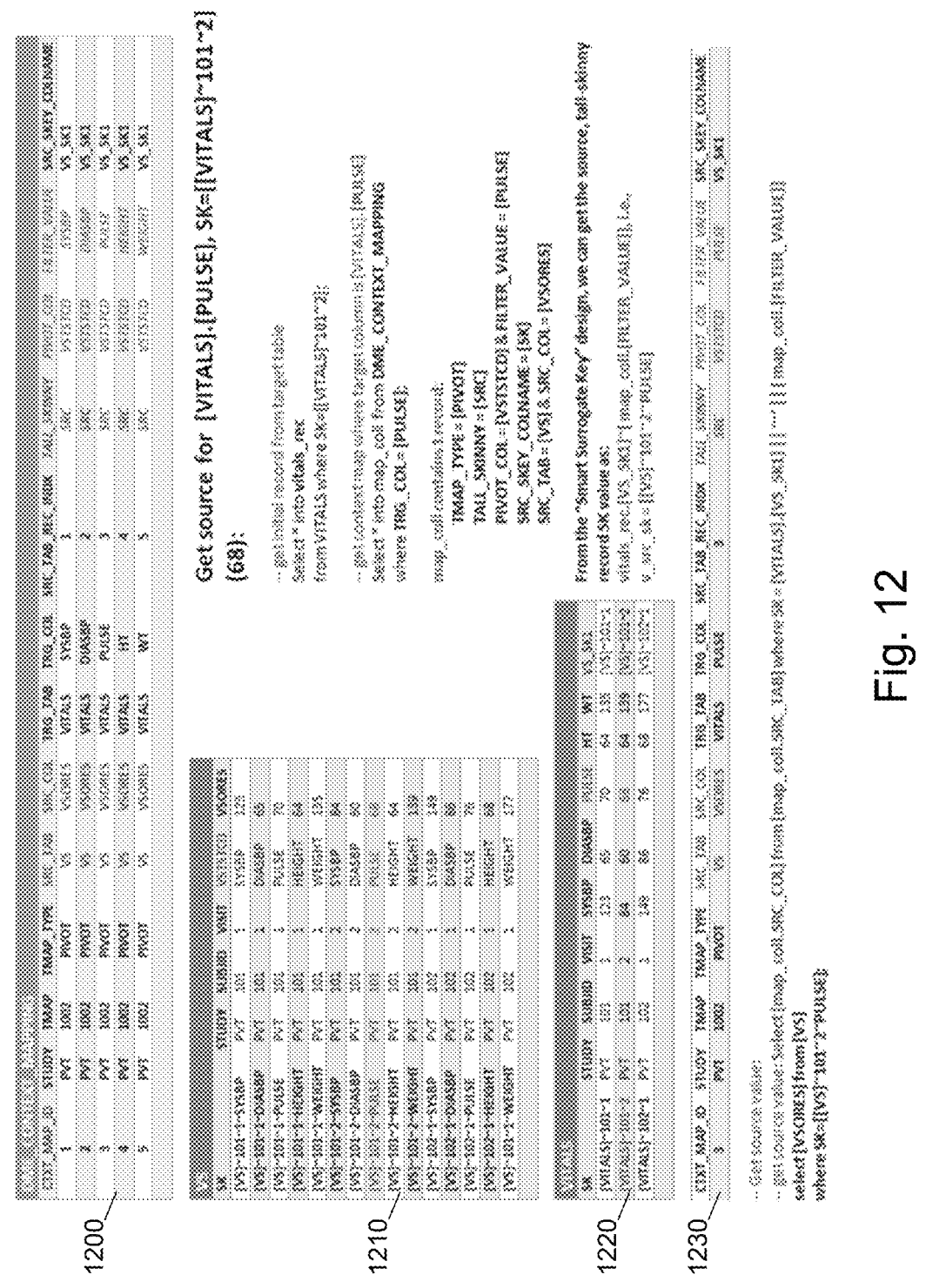

FIG. 12 illustrates an example source data lineage trace of a pivot transformation, according to an embodiment of the invention. This is a transformation from a vertical source table "VS" (i.e., source table 1210) to a horizontal target table "VITALS" (i.e., target table 1220). Source table 1210 has a pivot column identifying vital signs, column "VSTSTCD," and the vital sign values are stored in column "VSORES." There are five different vital sign values in the "VSTSTCD" column: "SYSBP," "DIASBP," "PULSE," "HEIGHT," and "WEIGHT." They are stored as filter values (i.e., values in column "FILTER_VALUE") in data lineage mapping table 1200, each with its corresponding column in target table 1220. Further, in source table 1210, each smart surrogate key value (i.e., value in column "SK") contains the filter value from its "VSTSTCD" column as the last component of the surrogate key value. Target table 1220 includes one column for each of the five vital signs collected: columns "SYSBP," "DIASBP," "PULSE," "HT," and "WT." The vital sign values are stored in the appropriate column for each subject. Each data record in target table 1220 consumes five data records in source table 1210; the filter values from the source column "VSTSTCD" in source table 1210 (i.e., "SYSBP," "DIASBP," "PULSE," "HEIGHT," and "WEIGHT") are transformed into columns in target table 1220 (i.e., columns "SYSBP," "DIASBP," "PULSE," "HT," and "WT").

In the example embodiment, a data lineage propagation module (such as data lineage propagation module 200 of FIG. 2) can find source data elements for the following target data element in target table 1220: column "PULSE" and data record identity (i.e., surrogate key) "[VITALS]~101~2". The data lineage propagation module can look up data lineage mapping table 1200 and find, for the target table "VITALS" (i.e., target table 1220), and a target column "PULSE," only one system record, system record 3 (identified in FIG. 12 as filtered data lineage mapping table 1230). This system record has a transformation map type of "PIVOT" for a TALL_SKINNY SOURCE table "VS" with a pivot column "VSTSTCD", and a source data item column "VSORES." The same system record, system record 3, (identified in FIG. 12 as filtered data lineage mapping table 1230) defines a target record auxiliary column to get a source record surrogate key value as "VS_SK1." According to the algorithm, a value from this column ("[VS]~101~2") can be combined by a data lineage propagation module (such as data lineage propagation module 200 of FIG. 2) with the filter value "PULSE" (i.e. "[VS]~101~2~PULSE") to find a correct record in the source table. Thus, the data lineage propagation module can further identify that the source data value is "68."

Figure 13:
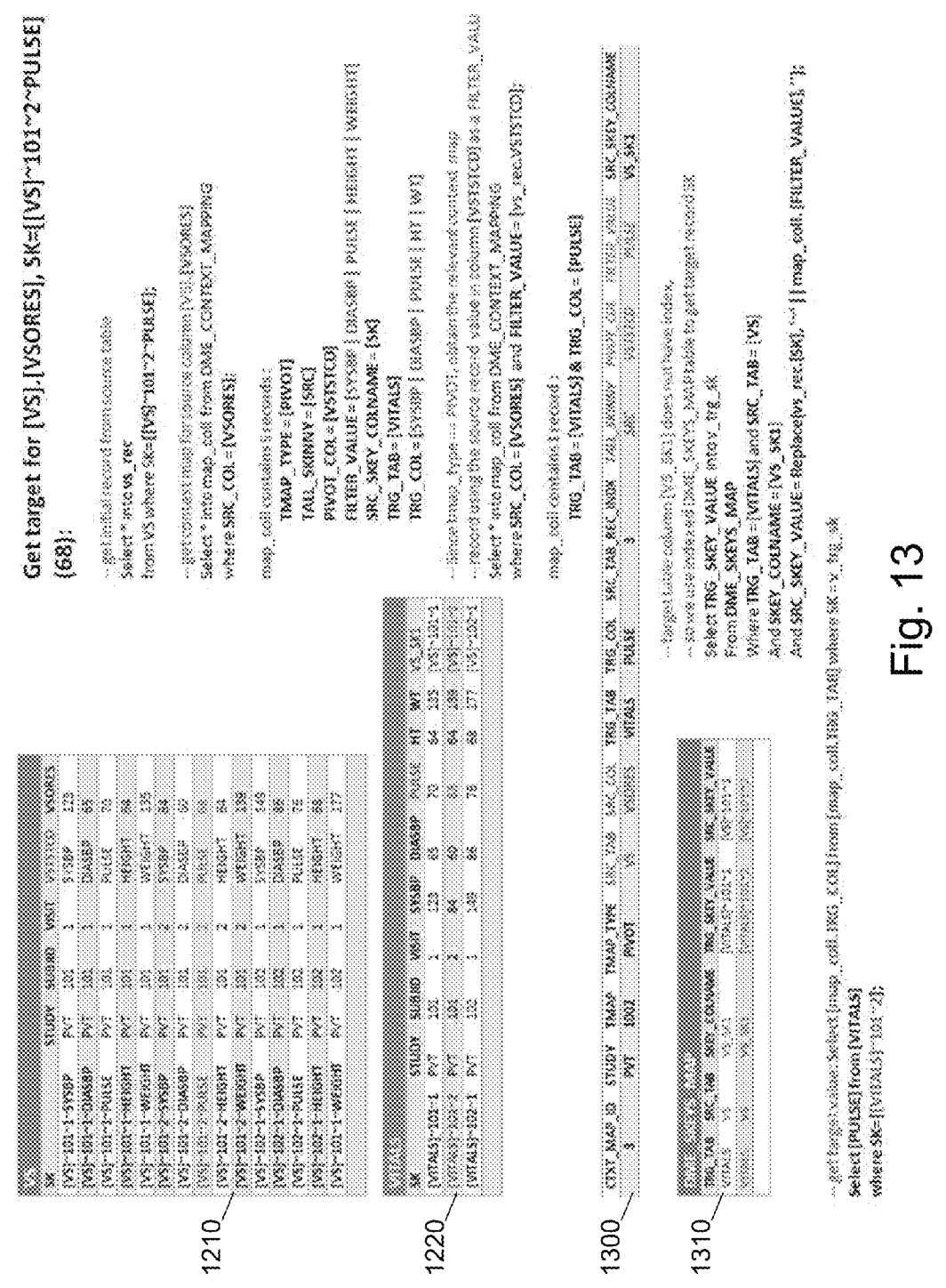

FIG. 13 illustrates an example target data lineage trace of a pivot transformation, according to an embodiment of the invention. As previous described, this is a transformation from a vertical source table "VS" (i.e., source table 1210 of FIG. 12), to a horizontal target table "VITALS" (i.e., target table 1220 of FIG. 12). In the example embodiment, a data lineage propagation module (such as data lineage propagation module 200 of FIG. 2) can find target data elements for the following source data element in source table 1210: column "VSORES" and data record identity (i.e., surrogate key) "[VS]~101~2~PULSE." The data lineage propagation module can look in data lineage mapping table 1200 of FIG. 12 and find column "VSORES" as a source column in five system records: system records 1, 2, 3, 4, and 5. The data lineage propagation module can then filter the system records in data lineage mapping table 1200 using the source data record data value in column "VSTSTCD" (i.e., "PULSE") to determine the correct system record in data lineage mapping table 1200. Thus, the data lineage propagation module can identify system record 3 as the correct system record in data lineage mapping table 1200 (identified in FIG. 13 as filtered data lineage mapping table 1300). From this information, the data lineage propagation module can determine that it needs to look for the target data element in the "PULSE" column of target table 1220. According to the algorithm for a pivot transformation, the data lineage propagation module can remove the filter value from the source surrogate key value, and can then search shadow table 1310 using the surrogate key "[VS~101~2]," and determine that the surrogate key of the desired data record in target table 1220 is "[VITALS]~101~2." Thus, the data lineage propagation module can identify that the target data element is in target table 1220, in column "PULSE" with a surrogate key value "[VITALS]~101~2." The data lineage propagation module can further identify that the target data value is "68."

Figure 14:
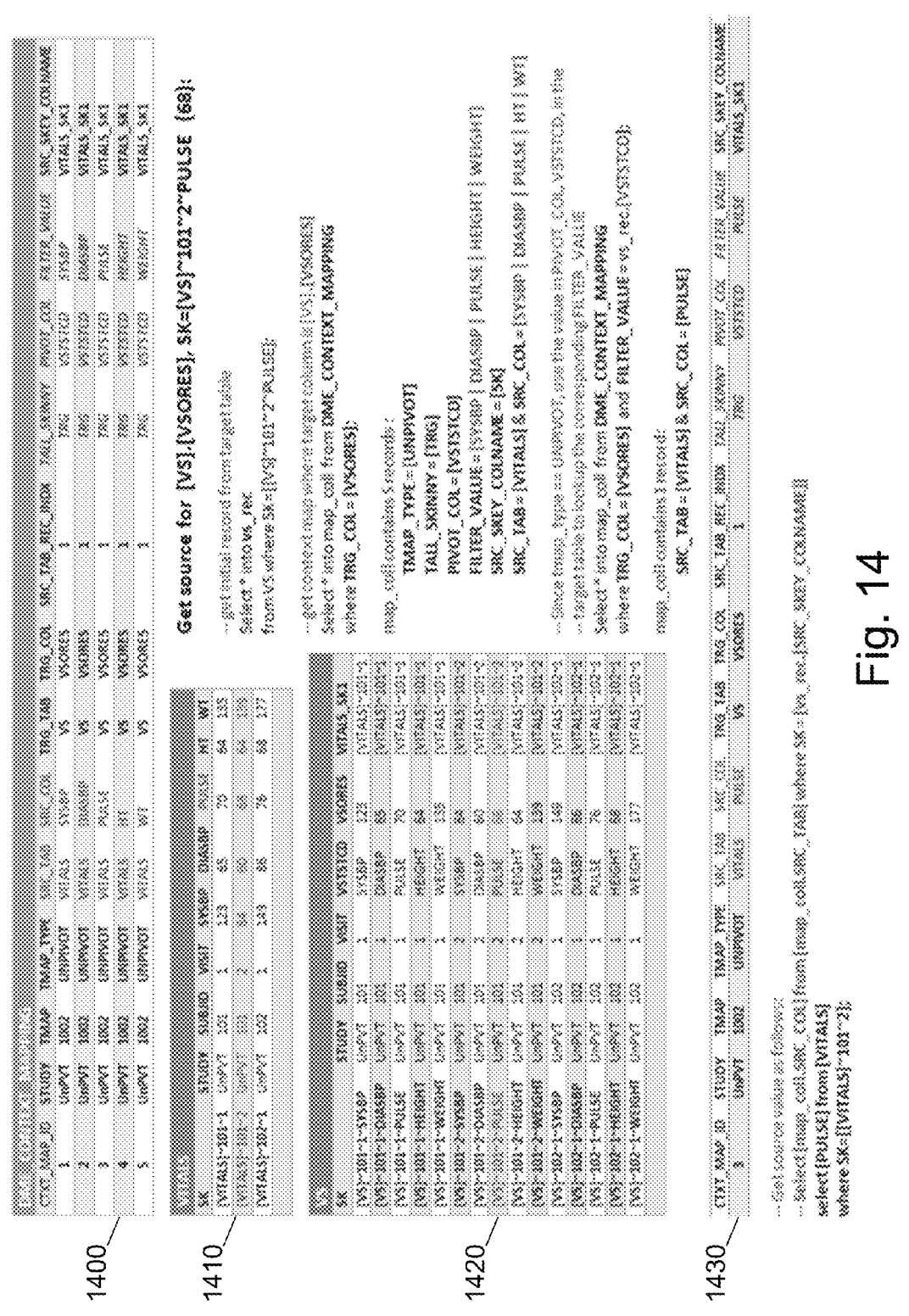

FIG. 14 illustrates an example source data lineage trace of an unpivot transformation, according to an embodiment of the invention. This is a transformation from a horizontal source table "VITALS" (i.e., source table 1410) to a vertical target table "VS" (i.e., target table 1420). Source table 1410 has one column for each of the five vital signals collected: columns "SYSBP," "DIASBP," "PULSE," "HT," and "WT." The vital sign values are stored in an appropriate column for each subject. Target table 1420 has a pivot column identifying vital signs, column "VSTSTCD," and the vital sign values are stored in column "VSORES." There are five different vital sign values in the "VSTSTCD" column: "SYSBP," DIASBP," "PULSE," "HEIGHT," and "WEIGHT." These are stored as filter values (i.e., values in column "FILTER_VALUE") in data lineage mapping table 1400, each with its corresponding column in source table 1410. Additionally, in data lineage mapping table 1400, the target table "VS" is marked as a "tall skinny" table. In target table 1420, each smart surrogate key value (i.e., value of column "SK") contains the filter value from its "VSTSTCD" column as the last component of the surrogate key value. Each data record in source table 1410 is transformed into five data records in target table 1420. Each of the five vital sign columns in source table 1410 (i.e., columns "SYSBP," "DIASBP," "PULSE," "HT," and "WT") become filter values in the column "VSTSTCD" of target table 1420 (i.e., "SYSBP," "DIASBP," "PULSE," "HEIGHT," AND "WEIGHT").

In the example embodiment, a data lineage propagation module (such as data lineage propagation module 200 of FIG. 2) can find source data elements for the following target data element in target table 1420: column "VSORES" and data record identity (i.e., surrogate key) "[VS]~101~2~PULSE." The data lineage propagation module can look in data lineage mapping table 1400 and find target table "VS" (i.e., target table 1420) as a target table, and find column "VSORES" as a target column, in five system records: system records 1, 2, 3, 4, and 5. Target column "VSTSTCD" is marked as target table "VS" pivot column. The data lineage propagation module can then filter the system records in data lineage mapping table 1400 using the target data record data value in column "VSTSTCD" (i.e., "PULSE") to determine the correct system record in data lineage mapping table 1400. Thus, the data lineage propagation module can identify system record 3 as the correct system record in data lineage mapping table 1400 (identified in FIG. 14 as filtered data lineage mapping table 1430). This system record has a transformation map type (i.e., column "TMAP_TYPE") of "UNPIVOT", a pivot column (i.e., column "PIVOT_COL") of "VSTSTCD," a source table (i.e., column "SRC_TAB") of "VITALS," and a source column (i.e., column "SRC_COL") of "PULSE." From the source surrogate key value (i.e., column "VITALS_SK1") of target table 1420, the data lineage propagation module can determine that the surrogate key of the source data record is "[VITALS]~101~2." Thus, the data lineage propagation module can identify that the source data element is in source table 1410, in column "PULSE" with a surrogate key value "[VITALS]~101~2." The data lineage propagation module can further identify that the source data value is "68."

Figure 15:
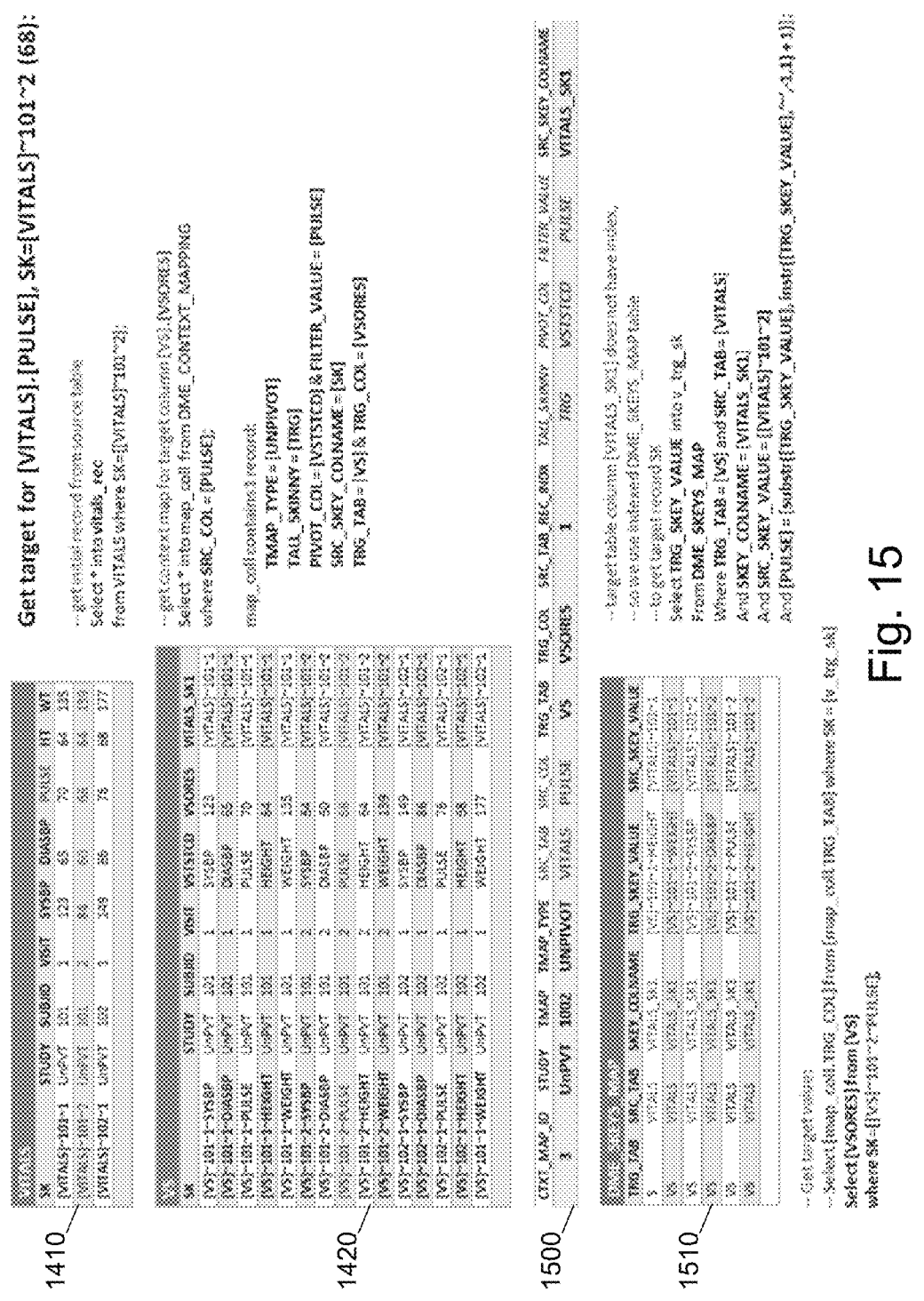

FIG. 15 illustrates an example target data lineage trace of an unpivot transformation, according to an embodiment of the invention. As previously described, this is a transformation from a horizontal source table "VITALS" (i.e., source table 1410 of FIG. 14), to a vertical target table "VS" (i.e., target table 1420 of FIG. 14). In the example embodiment, a data lineage propagation module (such as data lineage propagation module 200 of FIG. 2) can find target data elements for the following source data element in source table 1410: column "PULSE" and data record identity (i.e., surrogate key) "[VITALS]~101~2." The data lineage propagation module can look up data lineage mapping table 1400 of FIG. 14 and find source table "VITALS" (i.e., source table 1410) as a source table, and find column "PULSE" as a source column, in system record 3 (identified in FIG. 15 as filtered data lineage mapping table 1500). This system record has a transformation map type (i.e., column "TMAP_TYPE") of "UNPIVOT", a pivot column (i.e., column "PIVOT_COL") of "VSTSTCD," a target table (i.e., column "TRG_TAB") of "VS," and a target column (i.e., column "TRG_COL") of "VSORES." From this information, the data lineage propagation module can determine that it needs to look for the target data element in the "VSORES" column of target table 1420. The data lineage propagation module can then search shadow table 1510 using surrogate key "[VITALS]~101~2" of source table 1410, and determine that the surrogate key of the desired data record in target table 1420 is "[VS]~101~2~PULSE." To decrease the number of records in the shadow table, a data lineage propagation module (such as data lineage propagation module 200 of FIG. 2), for the unpivot transformations, stores an abbreviated value in column "TRG_SKEY_VALUE," i.e. without filter value. The data lineage propagation module then appends a filter value to the value in column "TRG_SKEY_VALUE" retrieved from the shadow table before using it as a target record identifier. Thus, the data lineage propagation module can identify that the target data element is in target table 1420, in column "VSORES" with a surrogate key value "[VS]~101~2~PULSE." The data lineage propagation module can further identify that the target data value is "68."

Figure 16:
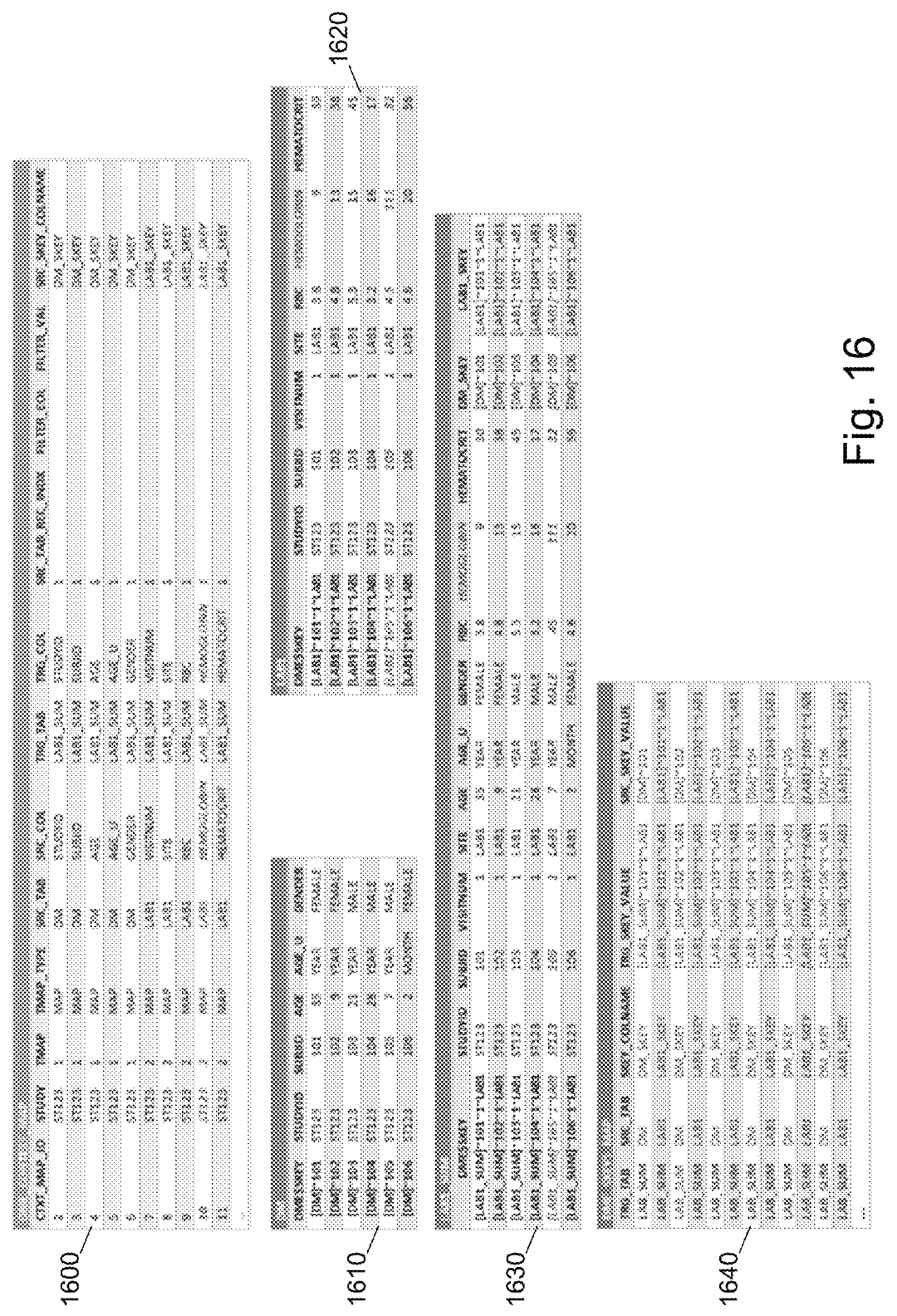

FIG. 16 illustrates an example data lineage trace of a join transformation, according to an embodiment of the invention. In the example embodiment, source tables "DM" and "LAB1" (i.e., source tables 1610 and 1620) are joined to form target table "LAB1_SUM") (i.e., target table 1630). Data lineage mapping table 1600 includes a system record for each column of target table 1630. Each system record includes a source table identity (i.e., column "SRC_TAB"), a source column identity (i.e., column "SRC_COL"), and a source surrogate key column identity (i.e., column "SRC_SKEY_COLNAME"). The source surrogate key column is an auxiliary column added to target table 1630 to store the source surrogate key for the data record in either source table 1610 (i.e., column "DM_SKEY") or source table 1620 (i.e., column "LAB1_SKEY") that contributed to the data record in target table 1620. For a join transformation, there is a source surrogate key auxiliary column for each table that contributes to the join, which are two tables (i.e., source tables 1610 and 1620) in this example. Source table 1610 includes data records representing demographic data for each study subject in the following columns: columns "AGE," "AGE_U," and "GENDER." Source table 1620 includes data records representing results for lab tests for different subjects in the following columns: columns "RBC," "HEMOGLOBIN," and "HEMATOCRIT." These two tables are joined to create target table 1630. Each data record of target table 1630 includes values from each source table of source tables 1610 and 1620. Therefore, each data record of target table 1630 stores two source surrogate key values (i.e., one source surrogate key value from each contributing source table). These source surrogate key values are stored in column "DM_SKEY," and column "LAB1 SKEY."

In the example embodiment, a data lineage propagation module (such as data lineage propagation module 200 of FIG. 2) can find source data elements for the following target data element in target table 1630: column "HEMOGLOBIN" and data record identity (i.e., surrogate key) "[LAB1_SUM]~105~1~LAB1." The data lineage propagation module can look up data lineage mapping table 1600 and find target table "LAB1_SUM" (i.e., target table 1630) as a target table, and find column "HEMOGLOBIN" as a target column, in system record 10. From this, the data lineage propagation module knows that the source data element is in source table "LAB1" (i.e., source table 1620) and source column "HEMOGLOBIN." The data lineage propagation module also knows that the source surrogate key value is found in the column "LAB1_SKEY" of target table 1630. In target table 1630, the data lineage propagation module can look in the column "LAB1_SKEY" for the target data record. This column contains the surrogate key value "[LAB1]~105~1~LAB1," and the data lineage propagation module knows the source table, source column, and the surrogate key value. Thus, the data lineage propagation module can identify that the source data element is in source table 1620, in column "HEMOGLOBIN" with a surrogate key value "[LAB1]~105~1~LAB1." The data lineage propagation module can further identify that the source data value is "111."

Further, in the example embodiment, the data lineage propagation module can find target data elements for the following source data element in source table 1620: column "HEMOGLOBIN" and data record identity (i.e., surrogate key) "[LAB1]~105~1~LAB1." The data lineage propagation module can look up data lineage mapping table 1600 and find source table "LAB1" (i.e., source table 1620) as a source table, and find column "HEMOGLOBIN" as a source column, in system record 10. From this information, the data lineage propagation module can determine that it needs to look for the target data element in the "HEMOGLOBIN" column of target table "LAB1_SUM" (i.e., target table 1630). The data lineage propagation module can then search shadow table 1640 using surrogate key "[LAB1]~105~1~LAB1" of source table 1620, and determine that the surrogate key of the desired data record in target table 1630 is "[LAB1_SUM]~105~1~LAB1." Thus, the data lineage propagation module can identify that the target data element is in target table 1630, in column "HEMOGLOBIN" with a surrogate key value "[LAB1_SUM]~105~1~LAB1." The data lineage propagation module can further identify that the target data value is "111."

Figure 17:
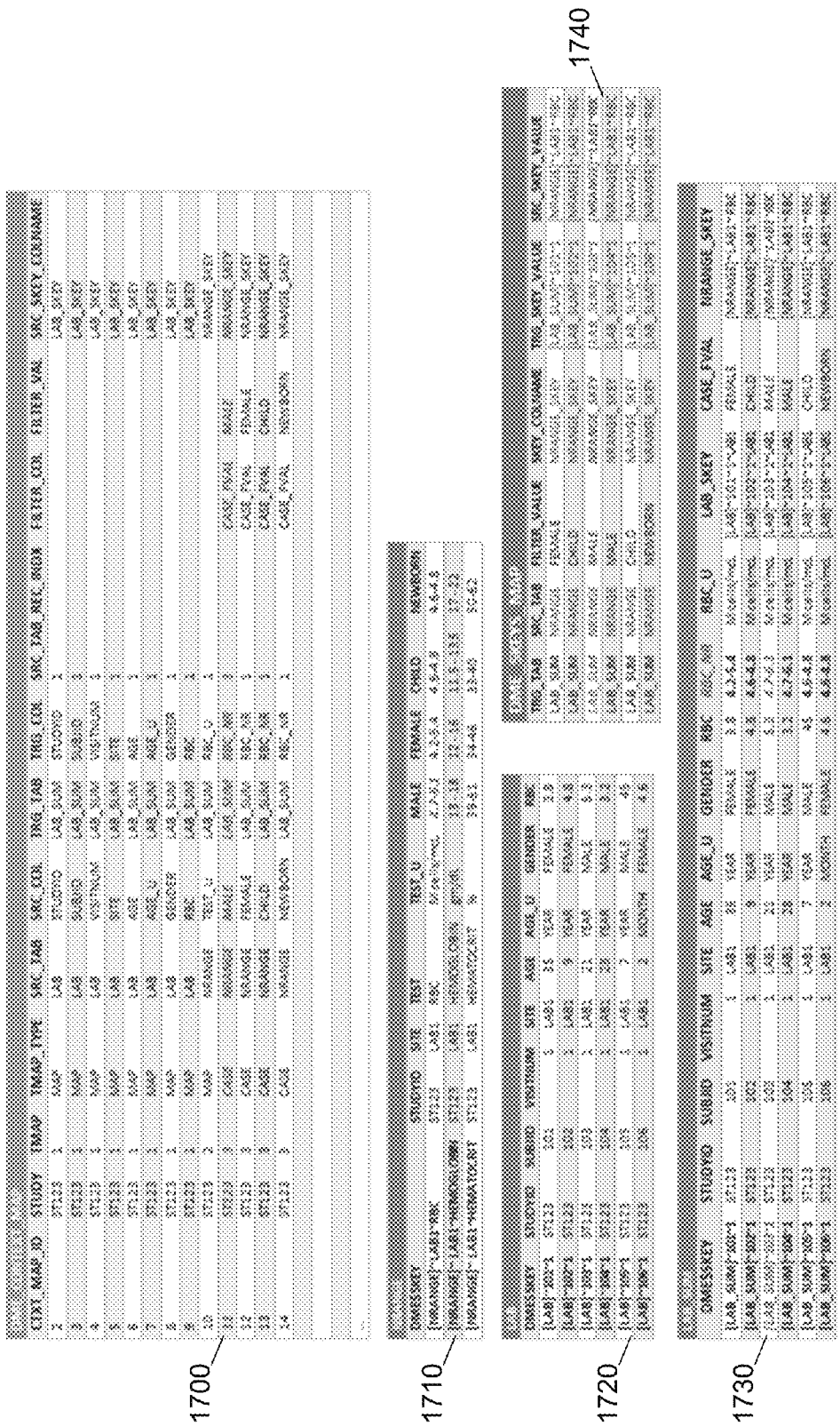
FIG. 17 illustrates an example data lineage trace of a case transformation, according to an embodiment of the invention.

FIG. 17 illustrates an example data lineage trace of a case transformation, according to an embodiment of the invention. In the example embodiment, source table "NRANGE" (i.e., source table 1710) includes normal range values for different blood tests for each demographic group. Source table "LAB" (i.e., source table 1720) includes lab test results for a group of subjects. Target table "LAB_SUM" (i.e., target table 1730) includes columns from source table 1720, plus columns containing a corresponding normal range and normal range unit from source table 1710. Target table 1730 further includes auxiliary columns: one filter column (i.e., column "CASE_FVAL") and two source surrogate key columns (i.e., columns "LAB_SKEY" and "NRANGE_SKEY").

In the example embodiment, a data lineage propagation module (such as data lineage propagation module 200 of FIG. 2) can find source data elements for the following target data element in target table 1730: column "RBC_NR" and data record identity (i.e., surrogate key) "[LAB_SUM]~103~1." The data lineage propagation module can look up data lineage mapping table 1700 and find target table "LAB_SUM" (i.e., target table 1730) as a target table, and find column "RBC_NR" as a target column, in four system records: system records 11, 12, 13, and 14. These four system records have a transformation map type (i.e., column "TMAP_TYPE") of "CASE." The data lineage propagation module uses two auxiliary columns in target table 1730 to determine the correct system record in data lineage mapping table 1700: column "NRANGE_SKEY" and column "CASE_FVAL"). Column "NRANGE_SKEY" stores a source table surrogate key, and has a corresponding identity in data lineage mapping table 1700 (i.e., column "SRC_SKEY_COLNAME." Column "CASE_FVAL" stores a case condition clause tag, and has a corresponding identity in data lineage mapping table 1700 (i.e., column "FILTER_COL"). The data lineage propagation module can determine that the data record in target table 1730 includes the value "MALE" in the filter column (i.e., COLUMN "CASE_FVAL"). The data lineage propagation module can further determine that the correct system record in data lineage mapping table 1700 is the system record with the matching identity in the "FILTER_VAL" column. Thus, from the four system records, the data lineage propagation module can determine that the system record that includes "MALE" in the "FILTER_VAL" column is system record 11. Thus, the source data element is from source table "NRANGE" (i.e., source table 1710), and has the column "MALE." The data lineage propagation module can further determine that the source surrogate key value is located in column "NRANGE_SKEY" of target table 1730, and that the source surrogate key value is "[NRANGE]~LAB1~RBC." The data lineage propagation module can further determine that the source data value is "4.7-6.1."

Further, in the example embodiment, the data lineage propagation module can find target data elements for the following source data element in source table 1710: column "MALE" and data record identity (i.e., surrogate key) "[NRANGE]~LAB1~RBC." The data lineage propagation module can look up data lineage mapping table 1700 and find source table "NRANGE") (i.e., source table 1710) as a source table, and find column "MALE" as a source column, in system record 11. From this information, the data lineage propagation module can determine that it needs to look for the target data element in the "RBC_NR" column of target table "LAB_SUM" (i.e., target table 1730). The data lineage propagation module can then search shadow table 1740 using surrogate key "[NRANGE]~LAB1~RBC" of source table 1710 and determine that the surrogate keys of the desired data records in target table 1730 are "[LAB_SUM]~103~1" and "[LAB_SUM]~104~1." Thus, the data lineage propagation module can identify that the two target data elements are in target table 1730, in column "RBC_NR" with surrogate key values "[LAB_SUM]~103~1," and "[LAB_SUM]~104~1." The data lineage propagation module can further identify that the target data value for both of these target data elements is "4.7-6.1."

Figure 18:
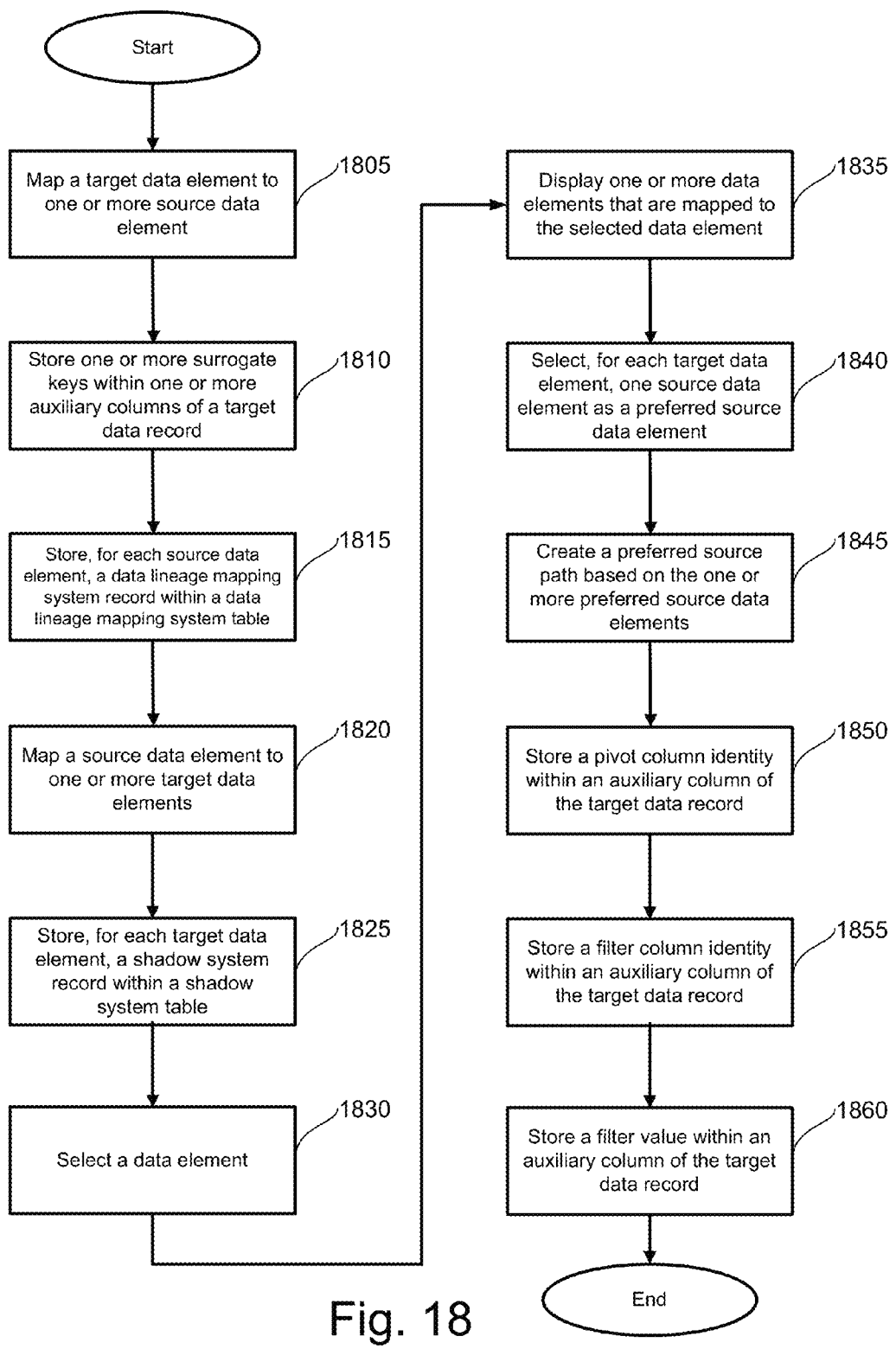
FIG. 18 illustrates a flow diagram of the functionality of a data lineage module, according to an embodiment of the invention.

FIG. 18 illustrates a flow diagram of the functionality of a data lineage module (such as data lineage module 16 of FIG. 1), according to an embodiment of the invention. In one embodiment, the functionality of the flow diagram of FIG. 18 (described below), as well as the functionality of the flow diagram of FIG. 19 (also described below), are each implemented by software stored in a memory or some other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 1805. At 1805, a target data element is mapped to one or more source data elements, as part of a data lineage of a data warehouse including one or more data tables, where each data table includes one or more data records. The target data element includes a column of a target data record. Each source data element includes a column of a source data record. The target data element is derived from the one or more source data elements using a data transformation. In one embodiment, the data warehouse includes one or more ordered data models. Each ordered data model includes one or more data tables. Further, one or more data tables of a subsequent data model are formed from at least one table of a previous data model using a data transformation. In one embodiment, the data transformation is one of: a direct mapping transformation, a union transformation, a join transformation, a horizontal to vertical unpivot transformation, a vertical to horizontal pivot transformation, or a case transformation. The flow proceeds to 1810.

At 1810, one or more source surrogate keys are stored within one or more auxiliary columns of the target data record. Each source surrogate key includes an identity of the source data record that includes a corresponding source data element. In one embodiment, each surrogate key of the one or more surrogate keys includes an identity of a source data table that comprises the source data record. In one embodiment, the one or more auxiliary columns are automatically added to the target data record based on the mapping of the target data element to the one or more source data elements. The flow proceeds to 1815.

At 1815, for each source data element, a data lineage mapping system record is stored within a data lineage mapping system table that represents the mapping of the target data element and the corresponding source data element. The data lineage mapping system record includes the corresponding source data element, the target data element, and the one or more auxiliary columns. According to the embodiment, the data lineage mapping system record also includes a type of the data transformation. The flow proceeds to 1820.

At 1820, a source data element is mapped to one or more target data elements, as part of the data lineage. The one or more target data elements are derived from the source data element using a data transformation. The flow proceeds to 1825.

At 1825, for each target data element, a shadow system record is stored within a shadow system table that represents the mapping of the source data element and the corresponding target data element. The shadow system record includes a source surrogate key that identifies the source data element, a target surrogate key that identifies the corresponding target data element, and the one or more auxiliary columns. Thus, according to the embodiment, the data lineage includes the one or more data lineage mapping system records, the one or more shadow system records, and the one or more source surrogate keys. The flow proceeds to 1830.

At 1830, a data element is selected from the one or more data elements that are mapped using the data lineage. The flow proceeds to 1835.

At 1835, one or more data elements that are mapped to the selected data element are displayed within a user interface using the data lineage. In one embodiment, the displaying of the one or more data elements that are mapped to the selected data element further includes, displaying, for each data element, a position of the data element within the data lineage. The flow proceeds to 1840.

At 1840, for each target data element, one source data element of the one or more source data elements is selected as a preferred source data element. The flow proceeds to 1845.

At 1845, a preferred source path of the data lineage is created based on the selected one or more preferred source data elements. The flow proceeds to 1850.

At 1850, a pivot column identity is stored within an auxiliary column of the target data record. The pivot column identity identifies a pivot column of the source data record. The flow proceeds to 1855.

At 1855, a filter column identity is stored within a first auxiliary column of the target data record. The filter column identity identifies a filter column of the source data record. The flow proceeds to 1860.

At 1860, a filter value is stored within a second auxiliary column of the target data record, wherein the filter value is a filter value of the source data record. The flow then ends.

Figure 19:
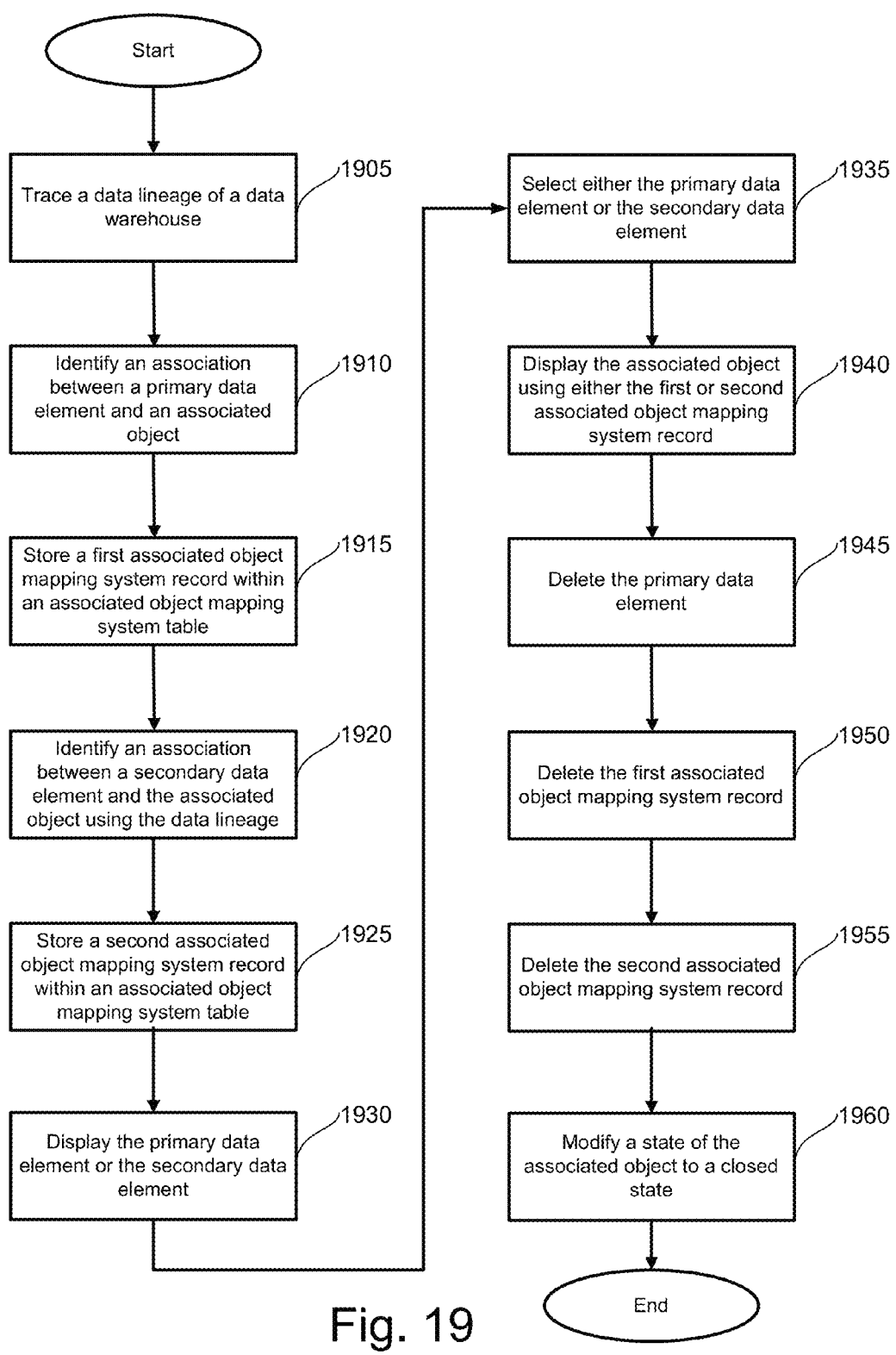
FIG. 19 illustrates a flow diagram of the functionality of an associated information propagation module, according to an embodiment of the invention.

FIG. 19 illustrates a flow diagram of the functionality of an associated information propagation module (such as an associated information propagation module that is part of functional modules 18 of FIG. 1), according to an embodiment of the invention. The flow begins at 1905. At 1905, tracing a data lineage of a data warehouse is traced. The data warehouse includes one or more data tables. Each data table includes one or more data records. In one embodiment, the data warehouse includes one or more ordered data models. Each ordered data model includes one or more data tables. Further, one or more data tables of a subsequent data model are formed from at least table of a previous data model using a data transformation. In one embodiment, the data transformation is one of: a direct mapping transformation, a union transformation, a join transformation, a horizontal to vertical unpivot transformation, a vertical to horizontal pivot transformation, or a case transformation. The flow proceeds to 1910.

At 1910, an association between a primary data element and an associated object is identified. The primary data element includes a column of a primary data record. The associated object comprises associated information. The association between the primary data element and the associated object is identified as a primary link. In one embodiment, the associated object is one of: a discrepancy, a comment, a status flag, a state indicator, a tag, an image, a recording, a file, a link, or a document. Also, in one embodiment, instead of the primary data element including a column of the primary data record, the primary data element includes the primary data record.

At 1915, a first associated object mapping system record is stored within an associated object mapping system table that represents the primary link. The first associated object mapping system record includes an identity of the primary data element, an identity of the associated object, and a primary link indicator. In one embodiment, the first associated object mapping system record includes a data element model identity that identifies a data model of the primary data element, a data element table identity that identifies a data table of the primary data element, and a data element column identity that identifies a column of the primary data element. The flow proceeds to 1920.

At 1920, an association between a secondary data element and the associated object is identified using the data lineage. The secondary data element includes a column of a secondary data record. The secondary data element is related to the primary data element within the data lineage. The association between the secondary data element and the associated object is identified as a secondary link. In one embodiment, the secondary data element is a source data element of the primary data element. Also in one embodiment, the identity of the primary data element and the identity of the secondary data element are each surrogate keys. Further, in one embodiment, instead of the secondary data element including a column of the secondary data record, the secondary data element includes the secondary data record. In one embodiment, the association between the secondary data element and the associated object is identified by using the data lineage to identify the secondary data element based on the primary data element. In an embodiment, additional associations between additional secondary data elements and the associated object are also identified using the data lineage. The flow proceeds to 1925.

At 1925, a second associated object mapping system record is stored within the associated object mapping system table that represents the secondary link, and that represents an association between the primary data element and the secondary data element. The second associated object mapping system record includes an identity of the secondary data element, an identity of the associated object, and a secondary link indicator. In one embodiment, the second associated object mapping system record includes a data element model identity that identifies a data model of the secondary data element, a data element table identity that identifies a data table of the secondary data element, and a data element column identity that identifies a column of the secondary data element. Further, in one embodiment, the second associated object mapping system record includes an indication that the secondary data element is a preferred source data element. In an embodiment where additional associations between additional secondary data elements and the associated object are also identified using the data lineage, additional associated object mapping system records are stored within the associated object mapping system table. The flow proceeds to 1930.

At 1930, the primary data element or the secondary data element is displayed within a user interface. In one embodiment, both the primary data element and the secondary data element are displayed within the user interface. The flow then proceeds to 1935.

At 1935, either the primary data element or the secondary data element is selected. The flow then proceeds to 1940.

At 1940, the associated object is displayed within the user interface using either the first associated object mapping system record or the second associated object mapping system record. More specifically, if the primary data element is selected, the associated object is displayed within the user interface using the first associated object mapping system record. If the secondary data element is selected, the associated object is displayed within the user interface using the second associated object mapping system record. In one embodiment, the display of the associated object is filtered by an associated object type. The flow proceeds to 1945.

At 1945, the primary data element is deleted. The flow proceeds to 1950.

At 1950, the first associated object mapping system record is deleted. The flow proceeds to 1955.

At 1955, the second associated object mapping system record is deleted. The flow proceeds to 1960.

At 1960, a state of the associated object is modified to a closed state. The flow ends.

Thus, in one embodiment, a system can be provided that can provide a data lineage trace of a set of data that can be stored within a data warehouse, where the set of data is stored within one or more tables, and where each table includes one or more data records. For a given target data element, the system can identify a set of source data elements that produced the target data element, where a "data element" includes a column of a data record. Similarly, for a given source data element, the system can identify an set of target data elements that are derived from the source data element as well as a path from the source data element to the set of target data elements. The data lineage trace provided by the system can further facilitate an in-depth analysis of the stored data.

Further, in another embodiment, a system can be provided that can leverage a data lineage trace to support the visibility of "associated information" or "associated objects" that are linked to data elements, and to propagate the associated information (i.e., associated objects) to related source data elements and target data elements. According to the embodiment, the system can store both primary links and secondary links between associated objects and the data elements or data records associated with the associated object. Thus, according to the embodiment, an associated object, such as a discrepancy, can be visible both upstream of the data element and downstream of the data element within the data lineage. This associated object visibility can further facilitate an in-depth analysis of the stored data.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to trace a data lineage of a data warehouse comprising one or more data tables, wherein each data table comprises one or more data records, the tracing comprising:

mapping a target data element to one or more source data elements, wherein the target data element comprises a column of a target table definition, and wherein each source data element comprises a column of a source table definition;

extending the target table definition to comprise one or more auxiliary columns to store one or more source surrogate keys;

storing, for each source data element, a data lineage mapping system record within a data lineage mapping system table that represents the mapping of the target data element and a corresponding source data element together with a column identity of an auxiliary column in a target table that stores a source surrogate key;

storing one or more source surrogate key values within one or more auxiliary columns of a target data record at the time the target data record is created or modified;

storing, for each target data record, one or more shadow system records within a shadow system table that represents a mapping of a source data record and a corresponding target data record source surrogate key value;

wherein the data lineage comprises the one or more data lineage mapping system records, the one or more shadow system records, and the one or more source surrogate keys;

storing a filter column identity within a first auxiliary column of the target data record, wherein the filter column identity identifies a filter column of the source data record; and storing a filter value within a second auxiliary column of the target data record, wherein the filter value is a filter value of the source data record.

2. The non-transitory computer-readable medium of claim 1, wherein the target data element is derived from the one or more source data elements using a data transformation;

wherein each source surrogate key comprises an identity of the source data record that comprises the corresponding source data element;

wherein the data lineage mapping system record comprises the corresponding source data element, the target data element, and the one or more auxiliary columns; and wherein at least one shadow system record comprises a source surrogate key value that identifies the source data record, a target surrogate key value that identifies the corresponding target data record, and one or more auxiliary column values.

3. The non-transitory computer-readable medium of claim 2, wherein the data transformation is one of: a direct mapping transformation, a union transformation, a join transformation, a horizontal to vertical unpivot transformation, a vertical to horizontal pivot transformation, or a case transformation.

4. The non-transitory computer-readable medium of claim 2, wherein the data lineage mapping system record further comprises a type of the data transformation.

5. The non-transitory computer-readable medium of claim 1, the tracing further comprising:
selecting a data element from the one or more data elements that are mapped using the data lineage; and
displaying one or more data elements that are mapped to the selected data element within a user interface using the data lineage.

6. The non-transitory computer-readable medium of claim 5, wherein the displaying of the data elements that are mapped to the selected data element further comprises, displaying, for each data element, a position of the data element within the data lineage.

7. The non-transitory computer-readable medium of claim 1, wherein each surrogate key of the one or more surrogate keys comprises an identity of a source data table that comprises the source data record.

8. The non-transitory computer-readable medium of claim 1, the tracing further comprising:
selecting, for each target data element, one source data element of the one or more source data elements as a preferred source data element; and
creating a preferred source path of the data lineage based on the selected one or more preferred source data elements.

9. The non-transitory computer-readable medium of claim 1, wherein the data warehouse comprises one or more ordered data models, wherein each ordered data model comprises one or more data tables, and wherein one or more data tables of a subsequent data model are formed from at least one table of a previous data model using a data transformation.

10. The non-transitory computer-readable medium of claim 1, the tracing further comprising storing a pivot column identity within an auxiliary column of the target data record, wherein the pivot column identity identifies a pivot column of the source data record.

11. The non-transitory computer-readable medium of claim 1, the tracing further comprising automatically adding the one or more auxiliary columns to the target data record based on the mapping of the target data element to the one or more source data elements.

12. A computer-implemented method for tracing a data lineage of a data warehouse, the computer-implemented method comprising:
mapping a target data element to one or more source data elements, wherein the target data element comprises a column of a target table definition, and wherein each source data element comprises a column of a source table definition;

extending the target table definition to comprise one or more auxiliary columns to store one or more source surrogate keys;

storing, for each source data element, a data lineage mapping system record within a data lineage mapping system table that represents the mapping of the target data element and a corresponding source data element together with a column identity of an auxiliary column in a target table that stores a source surrogate key;

storing one or more source surrogate key values within one or more auxiliary columns of a target data record at the time the target data record is created or modified;

storing, for each target data record, one or more shadow system records within a shadow system table that represents a mapping of a source data record and a corresponding target data record source surrogate key value;

wherein the data lineage comprises the one or more data lineage mapping system records, the one or more shadow system records, and the one or more source surrogate keys;

storing a filter column identity within a first auxiliary column of the target data record, wherein the filter column identity identifies a filter column of the source data record; and storing a filter value within a second auxiliary column of the target data record, wherein the filter value is a filter value of the source data record.

13. The computer-implemented method of claim 12,
wherein the target data element is derived from the one or more source data elements using a data transformation;
wherein each source surrogate key comprises an identity of the source data record that comprises the corresponding source data element;
wherein the data lineage mapping system record comprises the corresponding source data element, the target data element, and the one or more auxiliary columns; and
wherein at least one shadow system record comprises a source surrogate key value that identifies the source data record, a target surrogate key value that identifies the corresponding target data record, and one or more auxiliary column values.

14. The computer-implemented method of claim 12, further comprising:
selecting a data element from the one or more data elements that are mapped using the data lineage; and
displaying one or more data elements that are mapped to the selected data element within a user interface using the data lineage.

15. The computer-implemented method of claim 12, wherein each surrogate key of the one or more surrogate keys comprises an identity of a source data table that comprises the source data record.

16. The computer-implemented method of claim 12, further comprising:
selecting, for each target data element, one source data element of the one or more source data elements as a preferred source data element; and
creating a preferred source path of the data lineage based on the selected one or more preferred source data elements.

17. The computer-implemented method of claim 12, wherein the data warehouse comprises one or more ordered data models, wherein each ordered data model comprises one or more data tables, and wherein one or more data tables of a subsequent data model are formed from at least one table of a previous data model using a data transformation.

18. A system for tracing a data lineage of a data warehouse, the system comprising:
a processor;
a memory configured to store one or more instructions;
a data lineage mapping module configured to map a target data element to one or more source data elements, wherein the target data element comprises a column of a target table definition, and wherein each source data element comprises a column of a source table definition;
an extension module configured to extend the target table definition to comprise one or more auxiliary columns to store one or more source surrogate keys; and
a data lineage storage module configured to store, for each source data element, a data lineage mapping system record within a data lineage mapping system table that represents the mapping of the target data element and a corresponding source data element together with a column identity of an auxiliary column in a target table that stores a source surrogate key;
wherein the data lineage storage module is further configured to store one or more source surrogate key values within one or more auxiliary columns of a target data record at the time the target data record is created or modified;
wherein the data lineage storage module is further configured to store, for each target data record, one or more shadow system records within a shadow system table that represents a mapping of a source data record and a corresponding target data record source surrogate key value;
wherein the data lineage comprises the one or more data lineage mapping system records, the one or more shadow system records, and the one or more source surrogate keys;
wherein the data lineage storage module is further configured to store a filter column identity within a first auxiliary column of the target data record, wherein the filter column identity identifies a filter column of the source data record; and
wherein the data lineage storage module is further configured to store a filter value within a second auxiliary column of the target data record, wherein the filter value is a filter value of the source data record.

19. The system of claim 18,
wherein the target data element is derived from the one or more source data elements using a data transformation;
wherein each source surrogate key comprises an identity of the source data record that comprises the corresponding source data element;
wherein the data lineage mapping system record comprises the corresponding source data element, the target data element, and the one or more auxiliary columns; and
wherein at least one shadow system record comprises a source surrogate key value that identifies the source data record, a target surrogate key value that identifies the corresponding target data record, and one or more auxiliary column values.

20. The system of claim 18, further comprising:
a data element selection module configured to select a data element from the one or more data elements that are mapped using the data lineage; and
a data element display module configured to display one or more data elements that are mapped to the selected data element within a user interface using the data lineage.

21. The system of claim 18, wherein each surrogate key of the one or more surrogate keys comprises an identity of a source data table that comprises the source data record.

22. The system of claim 18, the tracing further comprising:
a data element selection module configured to select, for each target data element, one source data element of the one or more source data elements as a preferred source data element; and
a preferred source path module configured to create a preferred source path of the data lineage based on the selected one or more preferred source data elements.

23. The system of claim 18, wherein the data warehouse comprises one or more ordered data models, wherein each ordered data model comprises one or more data tables, and wherein one or more data tables of a subsequent data model are formed from at least one table of a previous data model using a data transformation.

24. A non-transitory computer-readable medium having instructions stored thereon that, when executed by a processor, cause the processor to trace a data lineage of a data warehouse comprising one or more data tables, wherein each data table comprises one or more data records, the tracing comprising:
mapping a target data element to one or more source data elements, wherein the target data element comprises a column of a target data table definition, and wherein each source data element comprises a column of a source table definition;
storing, for each source data element, a data lineage mapping system record within a data lineage mapping system table that represents the mapping of the target data element and a corresponding source data element;
storing, for each target data record, one or more shadow system records within a shadow system table that represents a mapping of a source data record and a corresponding target data record;
wherein the data lineage comprises the one or more data lineage mapping system records, and the one or more shadow system records;
storing a filter column identity within a first auxiliary column of the target data record, wherein the filter column identity identifies a filter column of the source data record; and
storing a filter value within a second auxiliary column of the target data record, wherein the filter value is a filter value of the source data record.

25. A computer-implemented method for tracing a data lineage of a data warehouse, the computer-implemented method comprising:
mapping a target data element to one or more source data elements, wherein the target data element comprises a column of a target data table definition, and wherein each source data element comprises a column of a source table definition;
storing, for each source data element, a data lineage mapping system record within a data lineage mapping system table that represents the mapping of the target data element and a corresponding source data element;
storing, for each target data record, one or more shadow system records within a shadow system table that represents a mapping of a source data record and a corresponding target data record;
wherein the data lineage comprises the one or more data lineage mapping system records, and the one or more shadow system records;
storing a filter column identity within a first auxiliary column of the target data record, wherein the filter column identity identifies a filter column of the source data record; and storing a filter value within a second auxiliary column of the target data record, wherein the filter value is a filter value of the source data record.

26. A system for tracing a data lineage of a data warehouse, the system comprising:
- a processor;
- a memory configured to store one or more instructions;
- a data lineage mapping module configured to mapping a target data element to one or more source data elements, wherein the target data element comprises a column of a target data table definition, and wherein each source data element comprises a column of a source table definition; and
- a data lineage storage module configured to store, for each target data record, one or more shadow system records within a shadow system table that represents a mapping of the source data record and a corresponding target data record;

wherein the data lineage storage module is further configured to store, for each target data record, one or more shadow system records within a shadow system table that represents a mapping of a source data record and a corresponding target data record;

wherein the data lineage comprises the one or more data lineage mapping system records, and the one or more shadow system records;

wherein the data lineage storage module is further configured to store a filter column identity within a first auxiliary column of the target data record, wherein the filter column identity identifies a filter column of the source data record; and wherein the data lineage storage module is further configured to store a filter value within a second auxiliary column of the target data record, wherein the filter value is a filter value of the source data record.

* * * * *

UNITED STATES PATENT AND TRADEMARK OFFICE
CERTIFICATE OF CORRECTION

PATENT NO. : 9,075,860 B2  
APPLICATION NO. : 13/803883  
DATED : July 7, 2015  
INVENTOR(S) : Kozina et al.

Page 1 of 1

It is certified that error appears in the above-identified patent and that said Letters Patent is hereby corrected as shown below:

In the Specification  
In column 21, line 33, delete "that that" and insert -- that --, therefor.

Signed and Sealed this  
Ninth Day of August, 2016

Michelle K. Lee  
*Director of the United States Patent and Trademark Office*